(12) United States Patent
Komura et al.

(10) Patent No.: US 12,411,455 B2
(45) Date of Patent: Sep. 9, 2025

(54) DISPLAY DEVICE FOR HEAD-MOUNTED DISPLAY

(71) Applicant: Magnolia White Corporation, Tokyo (JP)

(72) Inventors: Shinichi Komura, Tokyo (JP); Koichi Okuda, Tokyo (JP); Ken Onoda, Tokyo (JP); Hiroaki Kijima, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 431 days.

(21) Appl. No.: 17/970,681

(22) Filed: Oct. 21, 2022

(65) Prior Publication Data

US 2023/0127372 A1 Apr. 27, 2023

(30) Foreign Application Priority Data

Oct. 21, 2021 (JP) ................................ 2021-172361

(51) Int. Cl.
*G03H 1/22* (2006.01)
*G02B 5/30* (2006.01)

(52) U.S. Cl.
CPC ......... *G03H 1/2205* (2013.01); *G02B 5/3025* (2013.01); *G03H 2223/20* (2013.01); *G03H 2223/24* (2013.01)

(58) Field of Classification Search
CPC ............. G03H 1/2205; G03H 2223/20; G03H 2223/24; G02B 5/3025; G02B 5/32; G02B 2027/0174
See application file for complete search history.

(56) References Cited

U.S. PATENT DOCUMENTS

| | | |
|---|---|---|
| 6,421,183 B1 | 7/2002 | Ophey |
| 2001/0028332 A1 | 10/2001 | Roest |
| 2018/0180889 A1 | 6/2018 | Lee et al. |
| 2019/0079234 A1 | 3/2019 | Takagi et al. |
| 2019/0265493 A1 | 8/2019 | Takagi et al. |
| 2019/0265494 A1 | 8/2019 | Takagi et al. |

(Continued)

FOREIGN PATENT DOCUMENTS

| | | |
|---|---|---|
| JP | 2003-504663 A | 2/2003 |
| JP | 2003-529795 A | 10/2003 |

(Continued)

OTHER PUBLICATIONS

Office Action issued Apr. 1, 2025, in Japanese Patent Application No. 2021-172361, 6pp.

*Primary Examiner* — Tracie Y Green
(74) *Attorney, Agent, or Firm* — XSENSUS LLP

(57) ABSTRACT

According to one embodiment, a display device includes a display panel, a holographic element which reflects light having a specific incident angle and transmits light having an incident angle different from the specific incident angle, a retardation film provided between the display panel and the holographic element, a transflective element which reflects, of the light which passed through the holographic element, first circularly polarized light, and transmits second circularly polarized light rotating in an opposite direction of the first circularly polarized light, and a lens element which has a lens effect of condensing the second circularly polarized light which passed through the transflective element.

17 Claims, 17 Drawing Sheets

(56) References Cited

U.S. PATENT DOCUMENTS

| | | | |
|---|---|---|---|
| 2020/0050028 A1* | 2/2020 | Park | G02F 1/13362 |
| 2020/0132994 A1* | 4/2020 | Niu | H10K 50/856 |
| 2021/0033764 A1* | 2/2021 | Sato | G02B 5/3016 |
| 2021/0223548 A1 | 7/2021 | Maimone et al. | |
| 2021/0223549 A1* | 7/2021 | Maimone | G02B 17/004 |

FOREIGN PATENT DOCUMENTS

| | | |
|---|---|---|
| JP | 2018-106160 A | 7/2018 |
| JP | 2019-53152 A | 4/2019 |
| JP | 2019-148626 A | 9/2019 |
| JP | 2019-148627 A | 9/2019 |

* cited by examiner

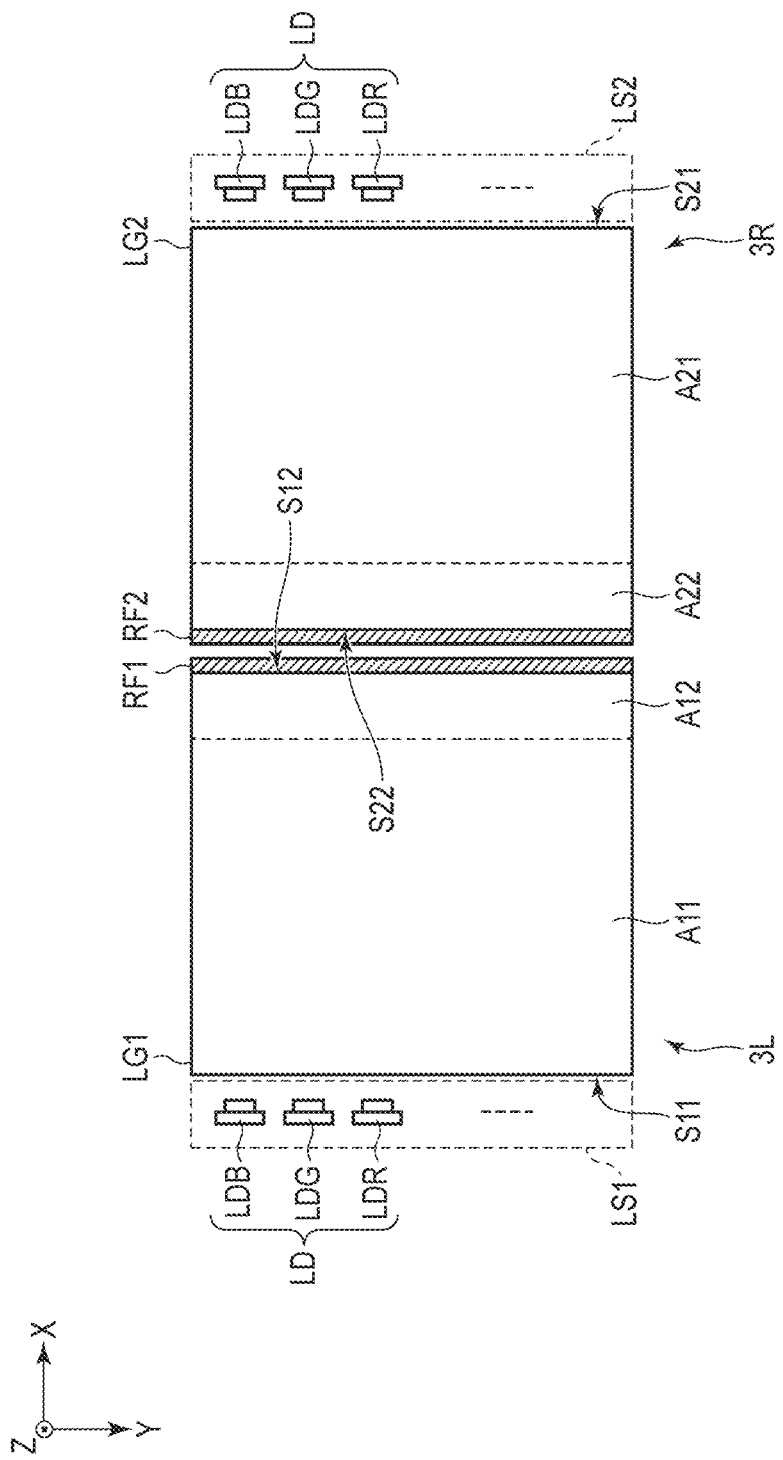
F I G. 13

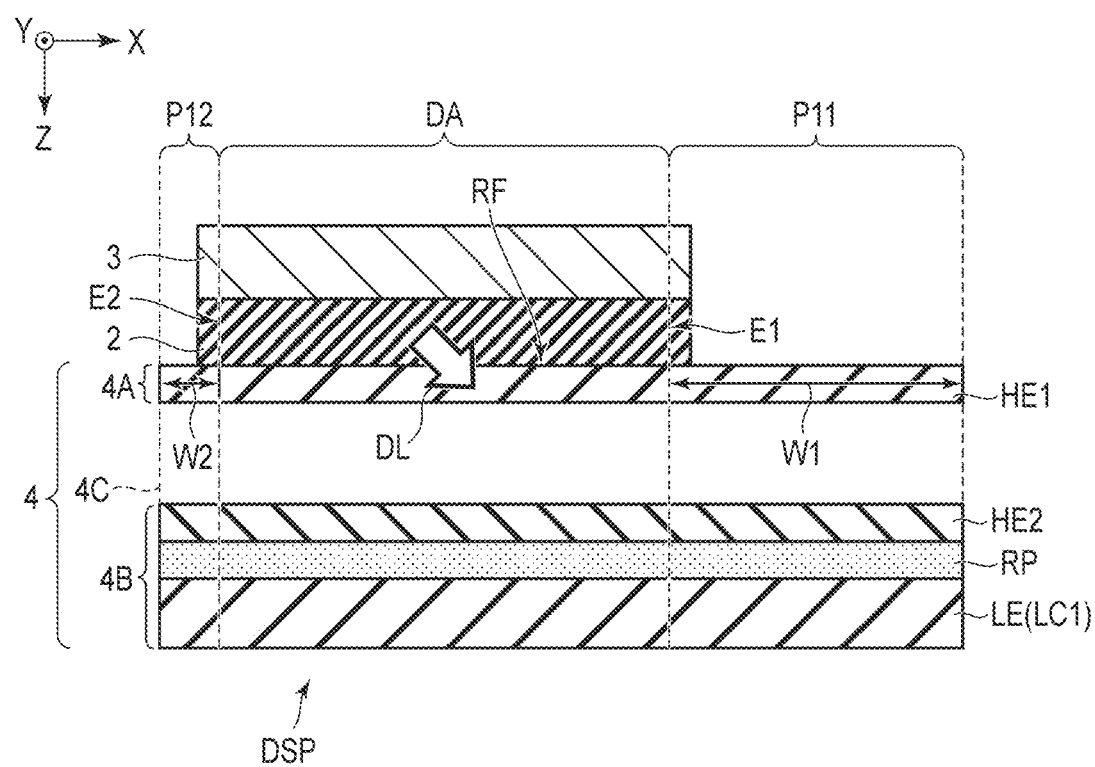
F I G. 15

DISPLAY DEVICE FOR HEAD-MOUNTED DISPLAY

CROSS-REFERENCE TO RELATED APPLICATIONS

This application is based upon and claims the benefit of priority from Japanese Patent Application No. 2021-172361, filed Oct. 21, 2021, the entire contents of which are incorporated herein by reference.

FIELD

Embodiments described herein relate generally to a display device.

BACKGROUND

In recent years, technology which uses a head-mounted display worn on the head of a user and provides, for example, virtual reality (VR) has been drawing attention. The head-mounted display is configured to display an image on a display provided in front of the eyes of the user. By this configuration, the user who wears the head-mounted display can experience a virtual reality space with realism.

BRIEF DESCRIPTION OF THE DRAWINGS

FIG. 13 is a plan view showing another configuration example of the illumination device which can be applied to the display device DSP shown in FIG. 3.

FIG. 15 is a cross-sectional view showing a second configuration example of the display device DSP.

DETAILED DESCRIPTION

Figure 1:
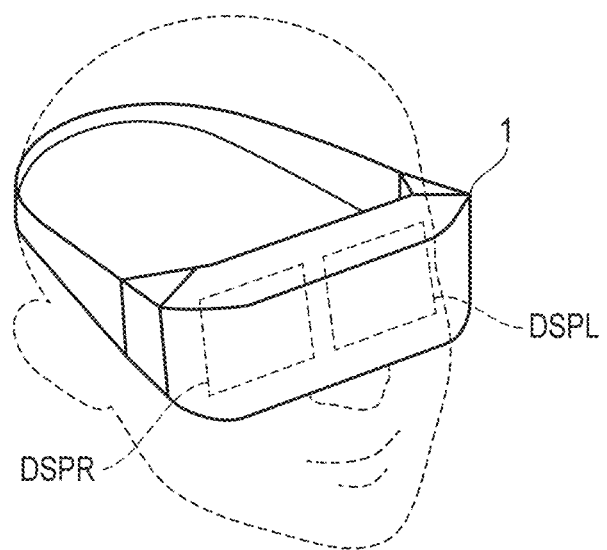
FIG. 1 is a perspective view showing an example of an appearance of a head-mounted display 1 to which a display device of an embodiment is applied.

In general, according to one embodiment, a display device comprises a display panel including a polarizer and comprising a display area configured to emit display light which is linearly polarized light, a holographic element which reflects light having a specific incident angle and transmits light having an incident angle different from the specific incident angle, a retardation film provided between the display panel and the holographic element, a transflective element which faces the holographic element across an intervening space, reflects, of the light which passed through the holographic element, first circularly polarized light, and transmits second circularly polarized light rotating in an opposite direction of the first circularly polarized light, and a lens element which faces the transflective element and has a lens effect of condensing the second circularly polarized light which passed through the transflective element.

According to another embodiment, a display device comprises a display panel including a polarizer and comprising a display area configured to emit display light which is linearly polarized light, a first holographic element which reflects light having a first specific incident angle and transmits light having an incident angle different from the first specific incident angle, a second holographic element which faces the first holographic element across an intervening space, reflects, of the light which passed through the first holographic element, light having a second specific incident angle different from the first specific incident angle, and transmits light having an incident angle different from the second specific incident angle, a lens element which faces the second holographic element and has a lens effect of condensing, of the light which passed through the second holographic element, first circularly polarized light, and a retardation film provided between the display panel and the first holographic element or between the second holographic element and the lens element.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the drawings, in order to facilitate understanding, an X-axis, a Y-axis and a Z-axis are shown depending on the need. The X-axis, the Y-axis and the Z-axis are orthogonal to each other. A direction parallel to the X-axis is referred to as a first direction X. A direction parallel to the Y-axis is referred to as a second direction Y. A direction parallel to the Z-axis is referred to as a third direction Z. The plane defined by the X-axis and the Y-axis is referred to as an X-Y plane. A plan view is defined as appearance when the X-Y plane is viewed.

FIG. 1 is a perspective view showing an example of the appearance of a head-mounted display 1 to which the display device of an embodiment is applied.

The head-mounted display 1 comprises, for example, a display device DSPR for the right eye and a display device DSPL for the left eye. In a state where the user wears the head-mounted display 1 on the head, the display device DSPR is provided to be located in front of the right eye of the user, and the display device DSPL is provided to be located in front of the left eye of the user.

Figure 2:
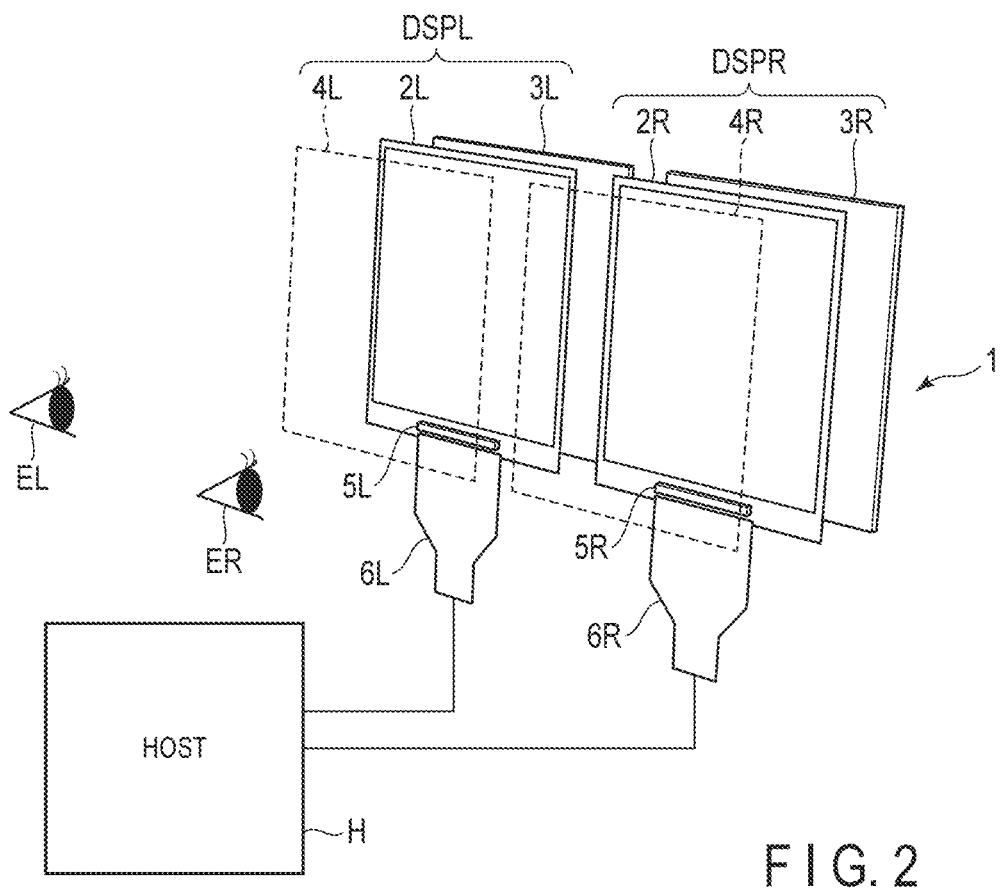
FIG. 2 is a diagram for explaining a configuration example of the head-mounted display 1 shown in FIG. 1.

FIG. 2 is a diagram for explaining a configuration example of the head-mounted display 1 shown in FIG. 1.

The display device DSPR comprises a display panel 2R, an illumination device 3R and an optical system 4R shown by dotted lines. The illumination device 3R is provided on the back side of the display panel 2R and is configured to illuminate the display panel 2R. The optical system 4R is provided on the front side of the display panel 2R (or between the right eye ER of the user and the display panel 2R) and is configured to guide the display light from the display panel 2R to the right eye ER.

The display panel 2R includes, for example, a liquid crystal panel and a polarizer. The display panel 2R is provided between the illumination device 3R and the optical system 4R. For example, a driver IC chip 5R and a flexible printed circuit board 6R are connected to the display panel 2R. The driver IC chip 5R controls the driving of the display panel 2R, especially, controls the display operation of the display panel 2R.

The display device DSPL comprises a display panel 2L, an illumination device 3L and an optical system 4L shown by dotted lines. The illumination device 3L is provided on the back side of the display panel 2L and is configured to illuminate the display panel 2L. The optical system 4L is provided on the front side of the display panel 2L (or between the left eye EL of the user and the display panel 2L) and is configured to guide the display light from the display panel 2L to the left eye EL.

The display panel 2L includes, for example, a liquid crystal panel and a polarizer. The display panel 2L is provided between the illumination device 3L and the optical system 4L. For example, a driver IC chip 5L and a flexible printed circuit board 6L are connected to the display panel 2L. The driver IC chip 5L controls the driving of the display panel 2L, especially, controls the display operation of the display panel 2L.

The display device DSPL is configured in substantially the same manner as the display device DSPR.

In other words, the display panel 2R, illumination device 3R and optical system 4R of the display device DSPR are configured in the same manner as the display panel 2L, illumination device 3L and optical system 4L of the display device DSPL, respectively.

In the display devices DSPR and DSPL of the present embodiment, each of the display panel 2R and 2L is not limited to an example which includes a liquid crystal panel. The display panels 2R and 2L may include a display panel comprising a self-luminous light emitting element such as an organic electroluminescent (EL) element, a micro LED or a mini LED. When each display panel is a display panel comprising a light emitting element, the illumination devices 3R and 3L are omitted. As specifically described later, the display panels 2R and 2L are configured to emit display light which is linearly polarized light and include a polarizer depending on the need.

An outside host computer H is connected to both of the display panels 2L and 2R. The host computer H outputs image data corresponding to the images displayed in the display panels 2L and 2R. The image displayed in the display panel 2L is an image for the left eye (or an image viewed by the left eye EL of the user). The image displayed in the display panel 2R is an image for the right eye (or an image viewed by the right eye ER of the user).

For example, when the head-mounted display 1 is used for VR, an image for the left eye and an image for the right eye are images which reproduce the parallax of both eyes and are similar to each other. When the image displayed in the display panel 2L for the left eye is viewed by the left eye EL of the user, and the image displayed in the display panel 2R for the right eye is viewed by the right eye ER of the user, the user can recognize a stereoscopic space (three-dimensional space) as a virtual reality space.

It should be noted that the display panels 2R and 2L may be configured as a single display panel which extends in front of both the left eye EL and the right eye ER. The illumination devices 3R and 3L may be configured as a single illumination device which extends in front of both the left eye EL and the right eye ER.

Now, this specification explains the first configuration example of the display device DSP according to the present embodiment.

First Configuration Example

Figure 3:
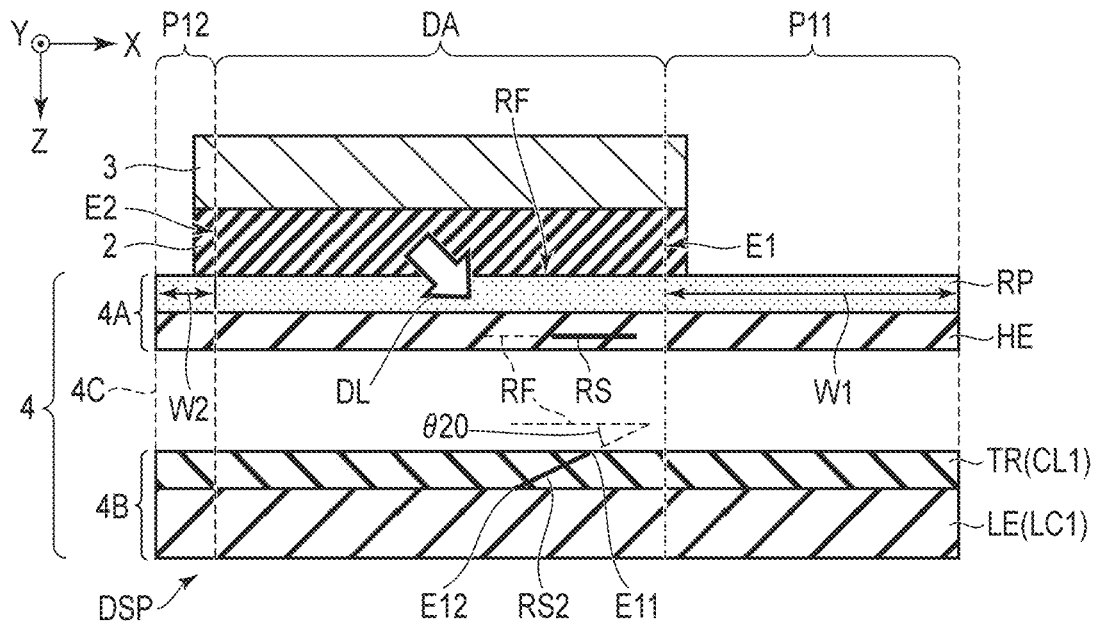
FIG. 3 is a cross-sectional view showing a first configuration example of the display device DSP.

FIG. 3 is a cross-sectional view showing the first configuration example of the display device DSP.

The display device DSP comprises a display panel 2, an illumination device 3 and an optical system 4. In the figure, the details of the display panel 2 and the illumination device 3 are omitted. The display device DSP explained here can be applied to each of the display devices DSPR and DSPL described above. The display panel 2 can be applied to each of the display panels 2R and 2L described above. The illumination device 3 can be applied to each of the illumination devices 3R and 3L described above. The optical system 4 can be applied to each of the optical systems 4R and 4L described above.

The display panel 2 is formed into a flat-plate shape extending over the X-Y plane. The details of the display panel 2 are described later. Briefly, the display panel 2 is configured to emit display light DL which is linearly polarized light in a display area DA. For example, the display panel 2 comprises a polarizer. Display light DL which is linearly polarized light is emitted via the polarizer.

In addition to the first configuration example explained here, in the other configuration examples, the display panel 2 is not limited to a liquid crystal panel. When the display panel 2 is a display panel comprising a self-luminous light emitting element, the illumination device 3 is omitted as described above. In this case, the display light DL emitted from the light emitting element passes through the polarizer and is converted into display light DL which is linearly polarized light.

The optical system 4 comprises a first structure 4A and a second structure 4B. The first structure 4A is spaced apart from the second structure 4B. In the example shown in FIG. 3, an air layer 4C is provided between the first structure 4A and the second structure 4B. The first structure 4A is provided between the display panel 2 and the second structure 4B (or between the display panel 2 and the air layer 4C).

The first structure 4A comprises a retardation film RP and a holographic element HE. The retardation film RP is a quarter-wave plate and is configured to impart a quarter-wave retardation to the light which passes through the retardation film RP.

The holographic element HE has an interference pattern and has the refractive-index distribution of a period corresponding to a wavelength in a thickness direction (third direction Z). This holographic element HE is configured to reflect and diffract part of the incident light. More specifically, the holographic element HE comprises a virtual reflective surface RS1. When the boundary between the display panel 2 and the retardation film RP, or a surface parallel to the X-Y plane is referred to as a reference surface RF, the reflective surface RS1 is parallel to the reference surface RF. In other words, angle θ10 between the reflective surface RS1 and the reference surface RF is 0°. The holographic element HE is configured to reflect the light which entered the holographic element HE at a specific incident angle relative to the normal of the reflective surface RS1 and to transmit the light which entered the holographic element HE at an incident angle different from the specific incident angle. This configuration is described in detail later.

The retardation film RP and the holographic element HE extend over a range which is wider than the display area DA in the X-Y plane. It should be noted that the retardation film RP has to cover at least the display area DA. The retardation film RP and the holographic element HE are stacked in the third direction Z. The retardation film RP is in contact with the display panel 2. The holographic element HE is in contact with the retardation film RP. The retardation film RP is provided between the display panel 2 and the holographic element HE.

The second structure 4B comprises a transflective element TR and a lens element LE.

As described in detail later, the transflective element TR comprises a cholesteric liquid crystal layer CL1 containing cholesteric liquid crystals which rotate in a direction. The cholesteric liquid crystal layer CL1 is configured to reflect, of the light having a specific wavelength, circularly polarized light having the same rotation direction as the cholesteric liquid crystals toward the first structure 4A and to transmit circularly polarized light having a rotation direction opposite to the rotation direction of the cholesteric liquid crystals. Here, the circularly polarized light reflected on the cholesteric liquid crystal layer CL1 is referred to as first circularly polarized light. The circularly polarized light which passes through the cholesteric liquid crystal layer CL1 is referred to second circularly polarized light.

The cholesteric liquid crystal layer CL1 comprises a reflective surface RS2 simplified in the figure. When the boundary between the display panel 2 and the retardation film RP, or a surface parallel to the X-Y plane is referred to as a reference surface RF, angle (inclination angle) θ20 between the reflective surface RS2 and the reference surface RF is an acute angle counterclockwise from the reference surface RF.

As described in detail later, the lens element LE comprises a liquid crystal layer LC1. The liquid crystal layer LC1 is configured to impart a half-wave retardation to light having a specific wavelength and have a lens effect of condensing the second circularly polarized light. It should be noted that the element having a lens effect of condensing circularly polarized light is not limited to an element using a liquid crystal.

The transflective element TR and the lens element LE extend over a range which is wider than the display area DA in the X-Y plane. The transflective element TR and the lens element LE are stacked in the third direction Z. The transflective element TR is in contact with the lens element LE. The transflective element TR is spaced apart from the holographic element HE, and faces the holographic element HE via, for example, the air layer 4C in the third direction Z.

The display area DA comprises a first end portion E1, and a second end portion E2 on the opposite side of the first end portion E1 in the first direction X. The holographic element HE, the transflective element TR and the lens element LE comprise a first portion P11 extending to the external side relative to the first end portion E1, and a second portion P12 extending to the external side relative to the second end portion E2. In the example shown in FIG. 3, the first portion P11 and the second portion P12 extend in the first direction X. Width W1 of the first portion P11 in the first direction X is greater than width W2 of the second portion P12 in the first direction X (W1>W2).

In FIG. 3, the first portion P11 is located on the right side relative to the display area DA, and the second portion P12 is located on the left side relative to the display area DA. The reflective surface RS2 of the transflective element TR comprises an end portion E11 on the right side of the figure (in other words, the side on which the first portion P11 is located), and an end portion E12 on the left side of the figure (in other words, the side on which the second portion P12 is located). The reflective surface RS2 inclines such that the end portion E11 is located on a side close to the display panel 2 and the end portion E12 is located on a side away from the display panel 2.

It is preferable that the display panel 2 and the retardation film RP should be firmly attached to each other without the intervention of an air layer. In addition, it is preferable that the retardation film RP and holographic element HE of the first structure 4A should be firmly attached to each other without the intervention of an air layer, etc. Further, it is preferable that the transflective element TR and lens element LE of the second structure 4B should be firmly attached to each other without the intervention of an air layer. This configuration can prevent undesired reflection or refraction on the interfaces between the members.

For example, the retardation film RP imparts a quarter-wave retardation to at least light having a green wavelength. However, the configuration of the retardation film RP is not limited to this example. For example, a wideband type of retardation film which imparts substantially a quarter-wave retardation to light having a red wavelength, light having a green wavelength and light having a blue wavelength may be applied to the retardation film RP. For example, this wideband type of retardation film may be prepared by attaching a quarter-wave plate to a half-wave plate in a state where the slow axis of the quarter-wave plate and the slow axis of the half-wave plate make a predetermined angle. This configuration can reduce the wavelength dependence in the retardation film RP.

Figure 4:
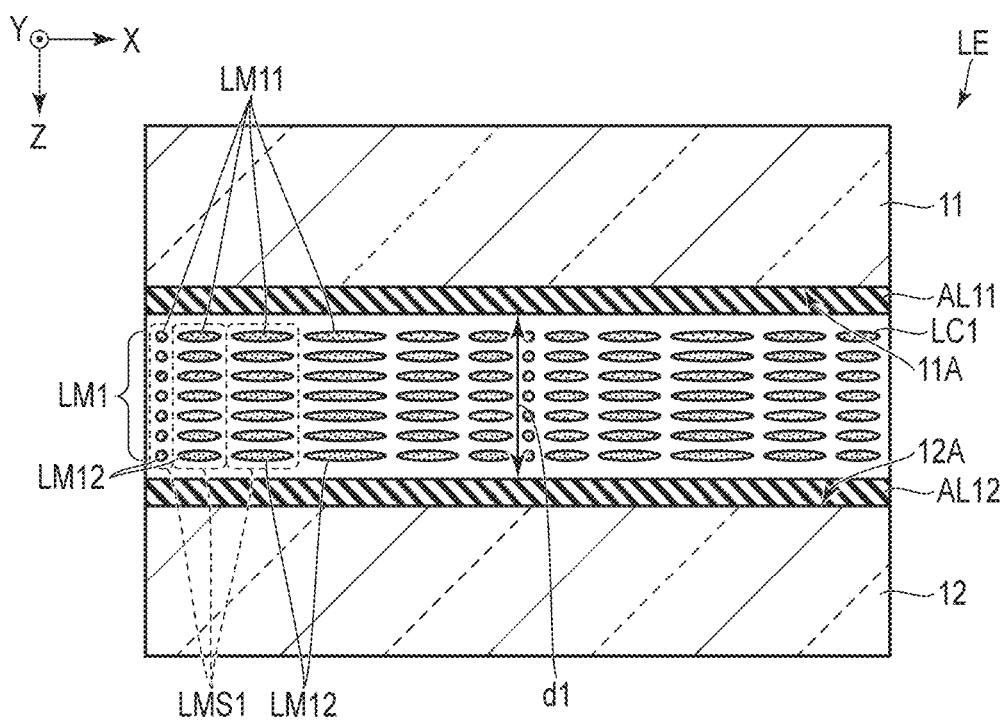
FIG. 4 is a cross-sectional view showing an example of the lens element LE shown in FIG. 3.

FIG. 4 is a cross-sectional view showing an example of the lens element LE shown in FIG. 3. The lens element LE comprises a substrate 11, an alignment film AL11, the liquid crystal layer LC1, an alignment film AL12 and a substrate 12. The substrates 11 and 12 are transparent substrates which transmit light, and consist of, for example, transparent glass plates or transparent synthetic resinous plates.

The alignment film AL11 is provided on the inner surface 11A of the substrate 11. In the example shown in FIG. 4, the alignment film AL11 is in contact with the substrate 11. However, a thin film may be interposed between the alignment film AL11 and the substrate 11.

The alignment film AL12 is provided on the inner surface 12A of the substrate 12. In the example shown in FIG. 4, the alignment film AL12 is in contact with the substrate 12. However, a thin film may be interposed between the alignment film AL12 and the substrate 12. The alignment film AL12 faces the alignment film AL11 in the third direction Z.

The alignment films AL11 and AL12 are formed of, for example, polyimide, and are both horizontal alignment films having an alignment restriction force along the X-Y plane.

The liquid crystal layer LC1 is provided between the alignment films AL11 and AL12, and is in contact with the alignment films AL11 and AL12. The liquid crystal layer LC1 has thickness d1 in the third direction Z. The liquid crystal layer LC1 comprises nematic liquid crystals in which the alignment direction along the third direction Z is uniform.

In other words, the liquid crystal layer LC1 comprises a plurality of liquid crystal structures LMS1. When this specification focuses on a liquid crystal structure LMS1, the liquid crystal structure LMS1 comprises a liquid crystal molecule LM11 located at an end of the liquid crystal structure LMS1, and a liquid crystal molecule LM12 located at the other end. The liquid crystal molecule LM11 is close to the alignment film AL11, and the liquid crystal molecule LM12 is close to the alignment film AL12. The alignment direction of the liquid crystal molecule LM11 is substantially coincident with the alignment direction of the liquid crystal molecule LM12. The alignment direction of another liquid crystal molecule LM1 between the liquid crystal molecule LM11 and the liquid crystal molecule LM12 is also substantially coincident with the alignment direction of the liquid crystal molecule LM11. Here, the alignment direction of each liquid crystal molecule LM1 is equivalent to the direction of the long axis of the liquid crystal molecule in the X-Y plane.

In the liquid crystal layer LC1, a plurality of liquid crystal structures LMS1 which are adjacent to each other in the first direction X have alignment directions different from each other. Similarly, a plurality of liquid crystal structures LMS1 which are adjacent to each other in the second direction Y have alignment directions different from each other. The alignment directions of the liquid crystal molecules LM11 arranged along the alignment film AL11 and the alignment directions of the liquid crystal molecules LM12 arranged along the alignment film AL12 successively (or linearly) change.

This liquid crystal layer LC1 is cured in a state where the alignment directions of the liquid crystal molecules LM1 including the liquid crystal molecule LM11 and the liquid crystal molecule LM12 are fixed. In other words, an electric field does not control the alignment directions of the liquid crystal molecules LM1. Thus, a liquid crystal element 10 does not comprise an electrode for alignment control.

When the refractive anisotropy of refraction property or the birefringence of the liquid crystal layer LC1 (the difference between refractive index ne for extraordinary light and refractive index no for ordinary light in the liquid crystal layer LC1) is defined as Δn, retardation Δn·d1 of the liquid crystal layer LC1 is set so as to be half a specific wavelength λ.

Figure 5:
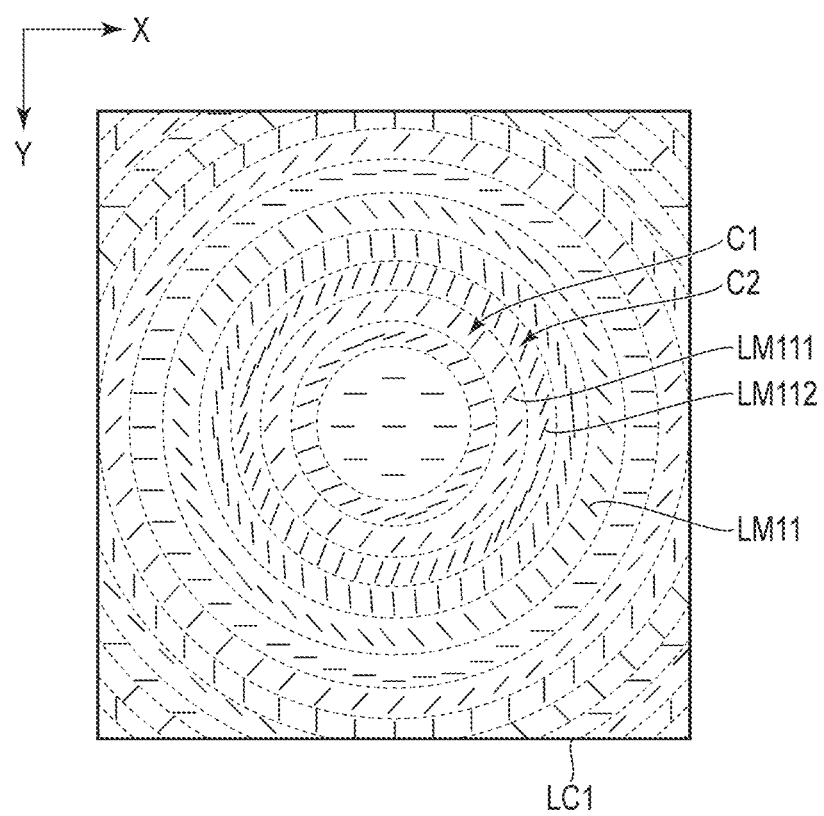
FIG. 5 is a plan view showing an example of an alignment pattern in the liquid crystal layer LC1 shown in FIG. 4.

FIG. 5 is a plan view showing an example of the alignment pattern in the liquid crystal layer LC1 shown in FIG. 4. FIG. 5 shows an example of a spacial phase in the X-Y plane of the liquid crystal layer LC1. Here, spacial phases are shown as the alignment directions of the liquid crystal molecules LM11 close to the alignment film AL11 among the liquid crystal molecules LM1 included in each liquid crystal structure LMS1.

In each concentric circle shown by a dotted line in the figure, the spacial phase is uniform. In an annular area surrounded by two adjacent concentric circles, the alignment directions of the liquid crystal molecules LM11 are uniform. However, between adjacent annular areas, the alignment directions of the liquid crystal molecules LM11 are different from each other.

For example, as seen in plan view, the liquid crystal layer LC1 comprises a first annular area C1 and a second annular area C2. The second annular area C2 is located on the external side relative to the first annular area C1. The first annular area C1 consists of a plurality of first liquid crystal molecules LM111 aligned in the same direction. The second annular area C2 consists of a plurality of second liquid crystal molecules LM112 aligned in the same direction. The alignment direction of the first liquid crystal molecules LM111 is different from that of the second liquid crystal molecules LM112.

Similarly, the alignment directions of the liquid crystal molecules LM11 arranged in the radial direction from the area of the center of the concentric circles are different from each other and sequentially change. In other words, in the X-Y plane shown in the figure, the spacial phase of the liquid crystal layer LC1 differs in the radial direction and sequentially changes.

When the second circularly polarized light having the specific wavelength λ enters the lens element LE having the above configuration, the second circularly polarized light is condensed toward the center of the concentric circles, and further, the transmitted light of the lens element LE is converted into the first circularly polarized light which rotates in the opposite direction of the second circularly polarized light.

Figure 6:
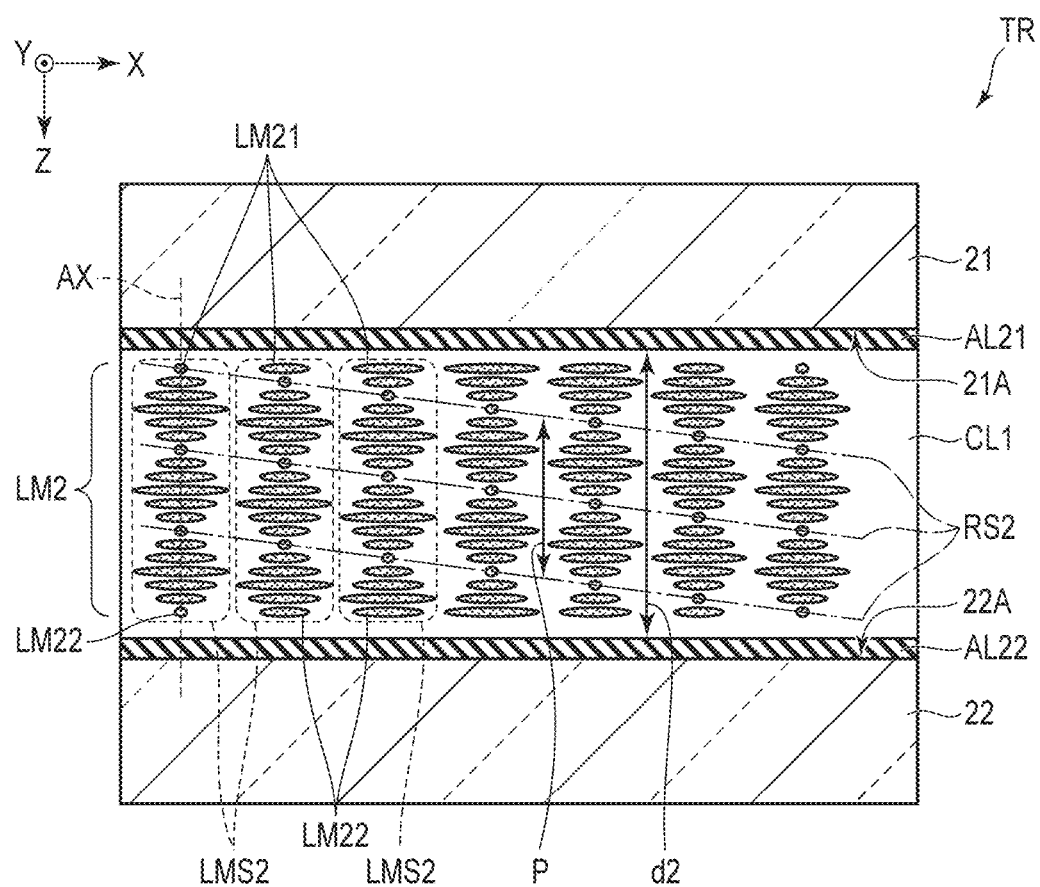
FIG. 6 is a cross-sectional view showing an example of the transflective element TR shown in FIG. 3.
Figure 7:
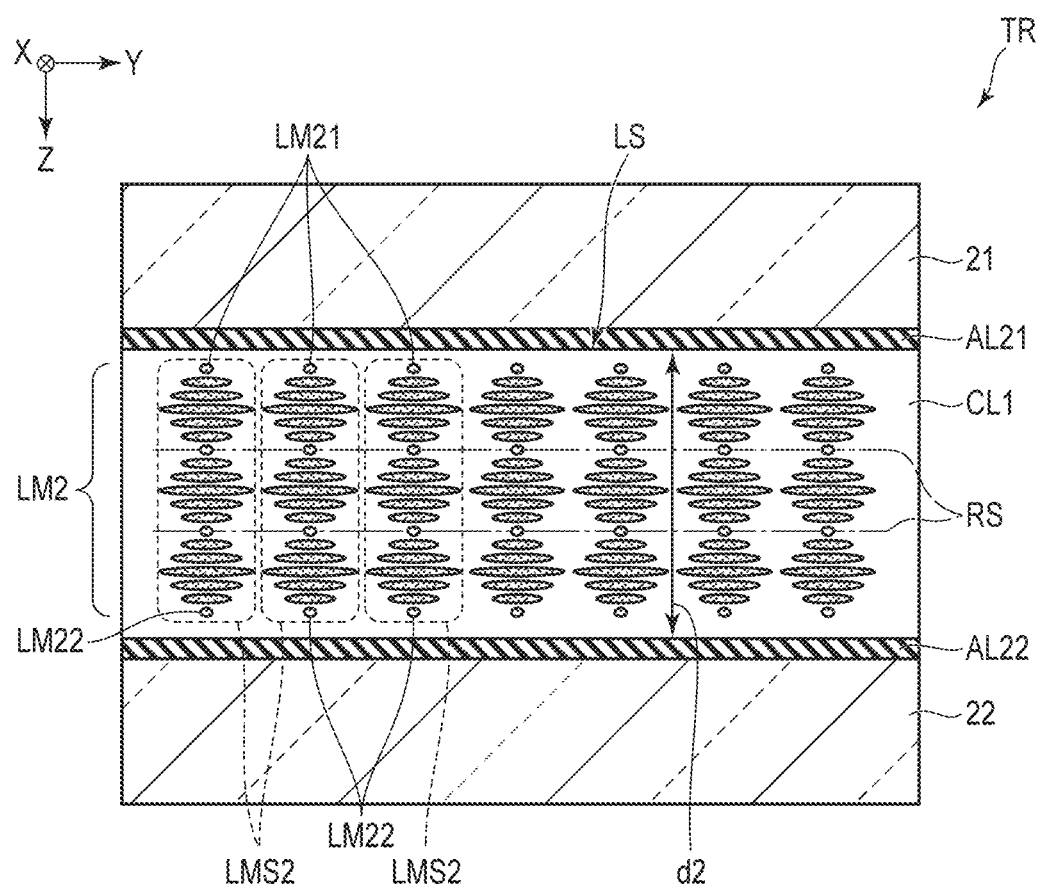
FIG. 7 is a cross-sectional view showing the example of the transflective element TR shown in FIG. 3.

FIG. 6 and FIG. 7 are cross-sectional views showing an example of the transflective element TR shown in FIG. 3. FIG. 6 shows the X-Z cross-sectional surface defined by the first direction X and the third direction Z. FIG. 7 shows the Y-Z cross-sectional surface defined by the second direction Y and the third direction Z. FIG. 6 is mainly used for the following explanation.

The transflective element TR comprises a substrate 21, an alignment film AL21, the cholesteric liquid crystal layer CL1, an alignment film AL22 and a substrate 22. The substrates 21 and 22 are transparent substrates which transmit light, and consist of, for example, transparent glass plates or transparent synthetic resinous plates.

The alignment film AL21 is provided on the inner surface 21A of the substrate 21. In the example shown in FIG. 6, the alignment film AL21 is in contact with the substrate 21. However, a thin film may be interposed between the alignment film AL21 and the substrate 21.

The alignment film AL22 is provided on the inner surface 22A of the substrate 22. In the example shown in FIG. 6, the alignment film AL22 is in contact with the substrate 22. However, a thin film may be interposed between the alignment film AL22 and the substrate 22. The alignment film AL22 faces the alignment film AL21 in the third direction Z.

The alignment films AL21 and AL22 are formed of, for example, polyimide, and are both horizontal alignment films having an alignment restriction force along the X-Y plane.

The cholesteric liquid crystal layer CL1 is provided between the alignment films AL21 and AL22, and is in contact with the alignment films AL21 and AL22. The cholesteric liquid crystal layer CL1 has thickness d2 in the third direction Z. In FIG. 6, to simplify the figure, each liquid crystal molecule LM2 is shown as a representative example of liquid crystal molecules facing the average alignment direction among the liquid crystal molecules located in the X-Y plane.

The cholesteric liquid crystal layer CL1 comprises a plurality of liquid crystal structures (helical structures) LMS2. When this specification focuses on a liquid crystal structure LMS2, the liquid crystal structure LMS2 comprises a liquid crystal molecule LM21 located at an end of the liquid crystal structure LMS2, and a liquid crystal molecule LM22 located at the other end. The liquid crystal molecule LM21 is close to the alignment film AL21, and the liquid crystal molecule LM22 is close to the alignment film AL22. A plurality of liquid crystal molecules LM2 including the liquid crystal molecule LM21 and the liquid crystal molecule LM22 are helically stacked in the third direction Z while rotating, and constitute the liquid crystal structure LMS2. In other words, the liquid crystal structure LMS2 is equivalent to a cholesteric liquid crystal. The liquid crystal structure LMS2 has a helical pitch P. The helical pitch P shows one period (360°) of the helix. For example, thickness d2 of the cholesteric liquid crystal layer CL1 is greater than or equal to several times the helical pitch P. The helical axis AX of the liquid crystal structure LMS2 is parallel to the normal direction of the substrate 21, in other words, the third direction Z.

As shown in FIG. 6, in the cholesteric liquid crystal layer CL1, a plurality of liquid crystal structures LMS2 which are adjacent to each other in the first direction X have alignment directions different from each other. The alignment directions of the liquid crystal molecules LM21 arranged along the alignment film AL21 and the alignment directions of the liquid crystal molecules LM22 arranged along the alignment film AL22 sequentially change.

As shown in FIG. 7, in the cholesteric liquid crystal layer CL1, a plurality of liquid crystal structures LMS2 which are adjacent to each other in the second direction Y have the same alignment direction. Thus, the alignment directions of the liquid crystal molecules LM21 arranged along the alignment film AL21 are substantially coincident with each other. In addition, the alignment directions of the liquid crystal molecules LM22 arranged along the alignment film AL22 are substantially coincident with each other. The cholesteric liquid crystal layer CL1 comprises a plurality of reflective surfaces RS2 shown by alternate long and short dash lines between the alignment film AL21 and the alignment film AL22. The reflective surfaces RS2 are substantially parallel to each other. Of the incident light, the reflective surfaces RS2 reflect partial circularly polarized light and transmit the other circularly polarized light in accordance with the Bragg's law. Each reflective surface RS2 is equivalent to a surface in which the alignment directions of the liquid crystal molecules are uniform, or a surface (an equiphase wave surface) in which the spacial phase is uniform.

In the X-Z cross-sectional surface shown in FIG. 6, each reflective surface RS2 inclines with respect to the boundary phase between the cholesteric liquid crystal layer CL1 and the alignment film AL21, the reference surface RF shown in FIG. 3 or the X-Y plane.

In the Y-Z cross-sectional surface shown in FIG. 7, each reflective surface RS2 is parallel to the X-Y plane. In other words, each reflective surface RS2 has substantially a planar shape extending in a certain direction as shown in FIG. 6 and FIG. 7.

Of the light having the specific wavelength A, the liquid crystal structures LMS2 reflect circularly polarized light having the same rotation direction as the cholesteric liquid crystals. For example, when the rotation direction of the cholesteric liquid crystals is right-handed, of the light having the specific wavelength A, the liquid crystal structures LMS2 reflect right-handed circularly polarized light and transmit left-handed circularly polarized light. Similarly, when the rotation direction of the cholesteric liquid crystals is left-handed, of the light having the specific wavelength A, the liquid crystal structures LMS2 reflect left-handed circularly polarized light and transmit right-handed circularly polarized light.

This cholesteric liquid crystal layer CL1 is cured in a state where the alignment directions of the liquid crystal molecules LM2 including the liquid crystal molecule LM21 and the liquid crystal molecule LM22 are fixed. In other words, an electric field does not control the alignment directions of the liquid crystal molecules LM2. Thus, the transflective element TR does not comprise an electrode for alignment control.

In general, the selective reflection band $\Delta\lambda$ of cholesteric liquid crystals for the light which underwent perpendicular incidence is shown by "no*P to ne*P" based on the helical pitch P of cholesteric liquid crystals, refractive index ne for extraordinary light and refractive index no for ordinary light. Thus, in order to effectively reflect circularly polarized light having the specific wavelength $\lambda$ on the reflective surfaces RS2, the helical pitch P and refractive indices ne and no are set such that the specific wavelength $\lambda$ is included in the selective reflection wavelength band $\Delta\lambda$.

Figure 8:
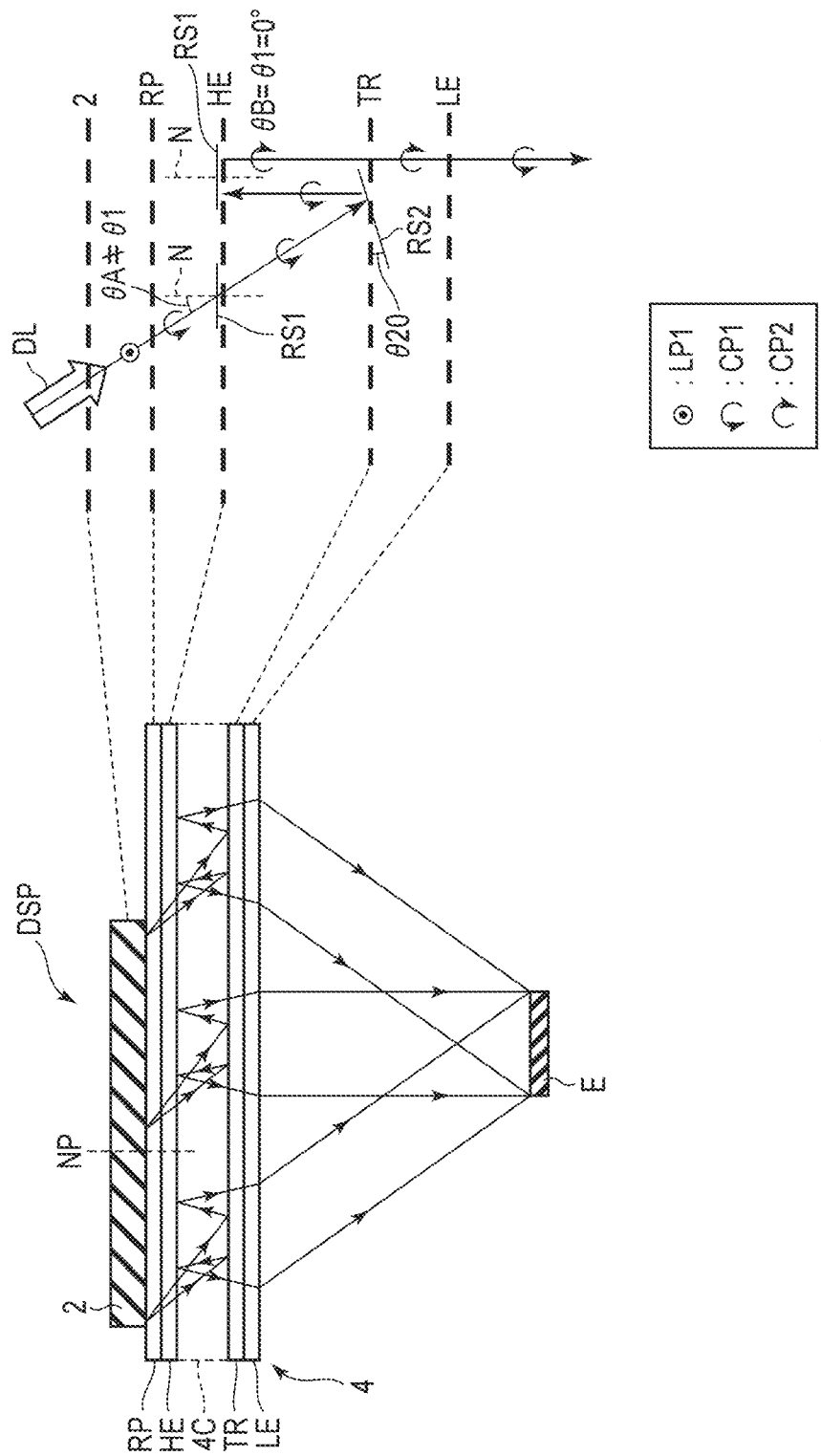
FIG. 8 is a diagram for explaining an example of the optical effect of the display device DSP shown in FIG. 3.

FIG. 8 is a diagram for explaining an example of the optical effect of the display device DSP shown in FIG. 3.

First, the display panel 2 emits display light DL which is first linearly polarized light LP1. Here, the first linearly polarized light LP1 is, for example, linearly polarized light which oscillates in a direction perpendicular to the drawing. The display light DL is emitted in an oblique direction with respect to normal NP of the display panel 2. A quarter-wave retardation is imparted to the display light DL when the display light DL passes through the retardation film RP. In this way, the display light DL is converted into first circularly polarized light CP1 when passing through the retardation film RP. Here, the first circularly polarized light CP1 is, for example, left-handed circularly polarized light.

The first circularly polarized light CP1 which passed through the retardation film RP enters the holographic element HE. Incident angle θA of the first circularly polarized light CP1 which enters the holographic element HE is different from the specific incident angle θ1 in the holographic element HE. Here, the incident angle is an angle between normal N of the virtual reflective surface RS1 and the incident light. In the example shown here, the specific angle θ1 of the holographic element HE is 0°. Thus, the holographic element HE is configured to reflect incident light which is parallel to normal N. For this reason, the first circularly polarized light CP1 having incident angle θA passes through the holographic element HE.

The first circularly polarized light CP1 which passed through the holographic element HE is reflected on the reflective surface RS2 of the transflective element TR toward the holographic element HE. When the first circularly polarized light CP1 is reflected on the reflective surface RS2, the polarization state is maintained. In other words, the reflected light on the reflective surface RS2 is the first circularly polarized light CP1. The reflective angle of the first circularly polarized light CP1 is controlled by the inclination angle θ20 of the reflective surface RS2, and is set such that the incident angle of the first circularly polarized light CP1 on the holographic element HE is set to the specific incident angle θ1. In the example shown here, the inclination angle θ20 is set such that the first circularly polarized light CP1 is reflected in a direction parallel to normal N of the holographic element HE.

The first circularly polarized light CP1 reflected on the transflective element TR enters the holographic element HE along normal N of the holographic element HE. Incident angle θB of the first circularly polarized light CP1 which enters the holographic element HE is substantially equal to the specific incident angle θ1 in the holographic element HE. Thus, the first circularly polarized light CP1 having incident angle θB is subjected to Bragg reflection (or specular reflection) on the reflective surface RS1 of the holographic element HE. The reflected light of the holographic element HE is converted into second circularly polarized light CP2 which rotates in the opposite direction of the first circularly polarized light CP1. Here, the second circularly polarized light CP2 is, for example, right-handed circularly polarized light.

The second circularly polarized light CP2 reflected on the holographic element HE passes through the transflective element TR. The second circularly polarized light CP2 which passed through the transflective element TR is converted into the first circularly polarized light CP1 in the lens element LE and is condensed to the eyes E of the user by a lens effect.

In the display device DSP having the above configuration, the optical system 4 comprises an optical path which is passed through three times between the holographic element HE and the transflective element TR. In this optical path, an oblique optical path from the holographic element HE to the transflective element TR is included. Thus, in the optical system 4, the optical distance between the holographic element HE and the transflective element TR is greater than or equal to three times the actual interval between the holographic element HE and the transflective element TR (or the thickness of the air layer 4C). The display panel 2 is provided on the internal side relative to the focal point of the lens element LE having a lens effect. By this configuration, the user can observe an enlarged virtual image.

According to the first configuration example described above, if the absorption in the structural members of the display device DSP and the reflection between the structural members are ignored, substantially 100% of the display light DL emitted from the display panel 2 can be condensed to the eyes E, and thus, the use efficiency of light can be improved.

In addition, compared to an optical system comprising an optical component formed of glass, resin, etc., the thickness in the third direction Z can be reduced, and the weight can be also decreased.

It should be noted that the first circularly polarized light CP1 explained with reference to FIG. 8 may be replaced by the second circularly polarized light CP2.

Figure 9:
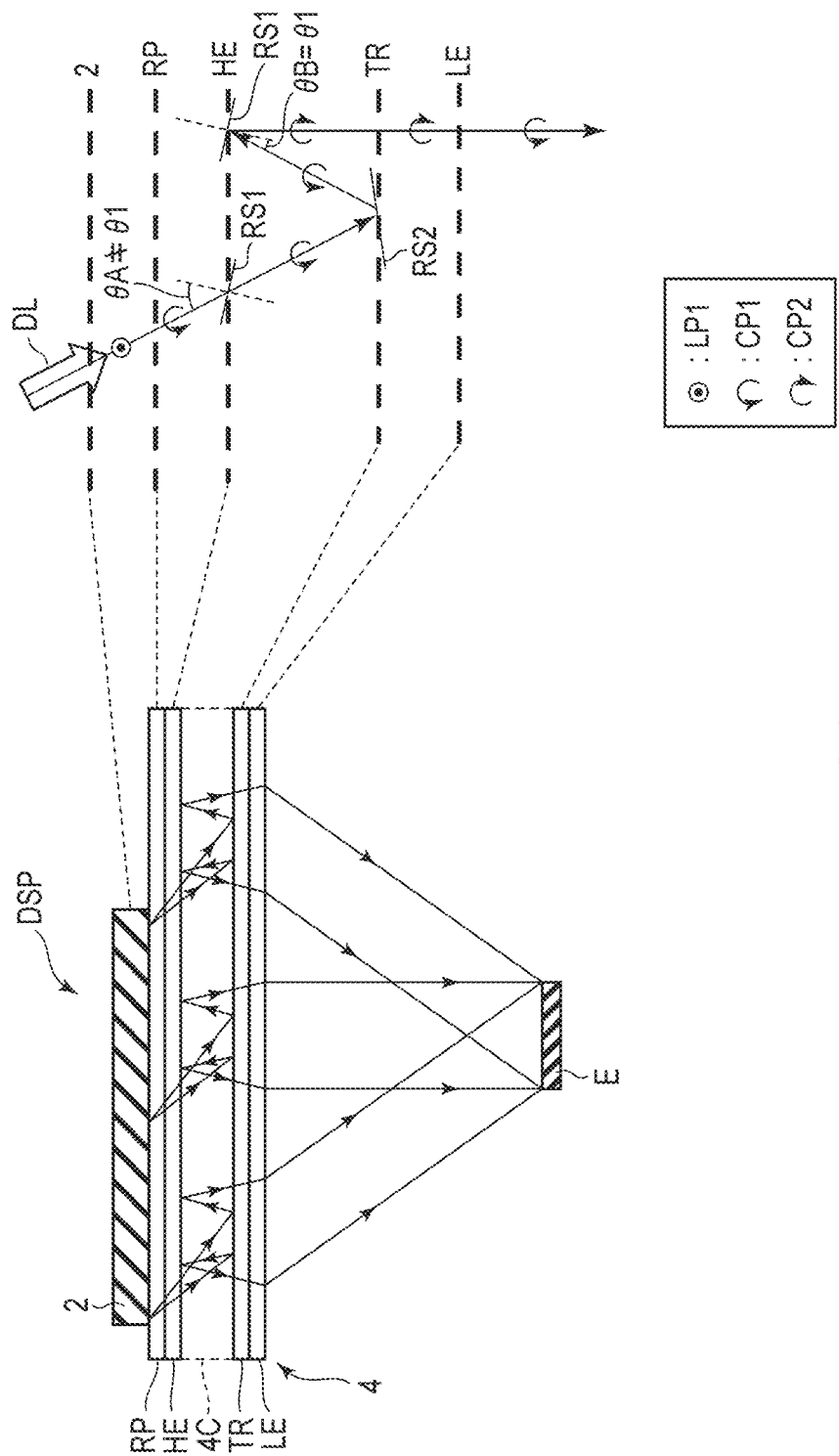
FIG. 9 is a diagram for explaining another example of the optical effect of the display device DSP shown in FIG. 3.

FIG. 9 is a diagram for explaining another example of the optical effect of the display device DSP shown in FIG. 3. The example shown in FIG. 9 is different from the example shown in FIG. 8 in respect that the specific incident angle θ1 of the holographic element HE is greater than 0°.

First, the display panel 2 obliquely emits display light DL which is first linearly polarized light LP1. When the display light DL passes through the retardation film RP, a quarter-wave retardation is imparted to the display light DL, and the display light DL is converted into first circularly polarized light CP1.

The first circularly polarized light CP1 which passed through the retardation film RP enters the holographic element HE. Incident angle θA of the first circularly polarized light CP1 which enters the holographic element HE is different from the specific incident angle θ1 in the holographic element HE. For this reason, the first circularly polarized light CP1 having incident angle θA passes through the holographic element HE.

The first circularly polarized light CP1 which passed through the holographic element HE is reflected on the reflective surface RS2 of the transflective element TR toward the holographic element HE. The reflective angle of the first circularly polarized light CP1 is set such that the incident angle of the first circularly polarized light CP1 on the holographic element HE is the specific incident angle θ1.

The first circularly polarized light CP1 reflected on the transflective element TR enters the holographic element HE. Incident angle θB of the first circularly polarized light CP1 which enters the holographic element HE is substantially equal to the specific incident angle θ1 in the holographic element HE. Thus, the first circularly polarized light CP1 having incident angle θB is subjected to Bragg reflection (or specular reflection) on the reflective surface RS1 of the holographic element HE. The reflected light of the holographic element HE is converted into second circularly polarized light CP2 which rotates in the opposite direction of the first circularly polarized light CP1.

The second circularly polarized light CP2 reflected on the holographic element HE passes through the transflective element TR. The second circularly polarized light CP2 which passed through the transflective element TR is converted into the first circularly polarized light CP1 in the lens element LE and is condensed to the eyes E of the user by a lens effect.

It should be noted that the first circularly polarized light CP1 explained with reference to FIG. 9 may be replaced by the second circularly polarized light CP2.

In the example shown in FIG. 9, effects similar to those of the example shown in FIG. 8 can be obtained. In the optical system 4, the optical path between the holographic element HE and the transflective element TR includes an oblique optical path from the transflective element TR to the holographic element HE in addition to an oblique path from the holographic element HE to the transflective element TR. For this reason, compared to the example of FIG. 8, the optical distance between the holographic element HE and the transflective element TR can be further extended.

Figure 10:
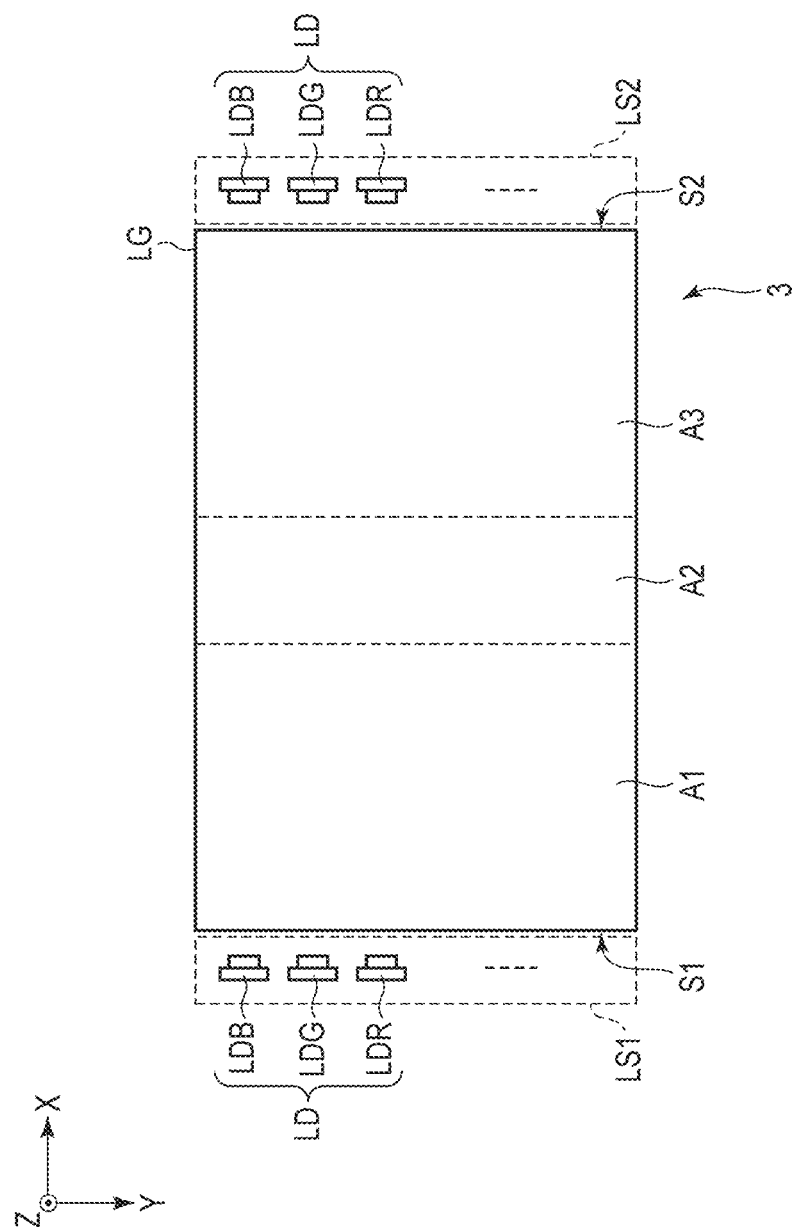
FIG. 10 is a plan view showing a configuration example of an illumination device 3 which can be applied to the display device DSP shown in FIG. 3.

FIG. 10 is a plan view showing a configuration example of the illumination device 3 which can be applied to the display device DSP shown in FIG. 3. FIG. 10 shows only the main portions of the illumination device 3.

The illumination device 3 comprises a light guide LG, a first light source unit LS1 and a second light source unit LS2. The light guide LG comprises a side surface S1 and a side surface S2. The side surface S1 faces the side surface S2 in the first direction X. The light guide LG comprises an area A1, an area A2 and an area A3. The thickness of the area A2 in the third direction Z is substantially constant. The thickness of the area A1 gradually increases from the side surface S1 toward the area A2. The thickness of the area A3 gradually increases from the side surface S2 toward the area A2.

The first light source unit LS1 is provided along the side surface S1. The second light source unit LS2 is provided along the side surface S2. Each of the first light source unit LS1 and the second light source unit LS2 comprises a plurality of light emitting elements LD. Each of the first light source unit LS1 and the second light source unit LS2 comprises, as the light emitting elements LD, a first light emitting element LDB which emits light having a blue wavelength (first wavelength), a second light emitting element LDG which emits light having a green wavelength (second wavelength) and a third light emitting element LDR which emits light having a red wavelength (third wavelength). The first light emitting element LDB, the second light emitting element LDG and the third light emitting element LDR are arranged at intervals.

The emitted light from each light emitting element LD should preferably have a narrow spectral width (or a high color purity). Thus, as each light emitting element LD, a laser light source should be preferably applied. The center wavelength of the blue laser beam emitted from the first light emitting element (first laser light source) LDB is defined as λb. The center wavelength of the green laser beam emitted from the second light emitting element (second laser light source) LDG is defined as λg. The center wavelength of the red laser beam emitted from the third light emitting element (third laser light source) LDR is defined as λr.

Figure 11:
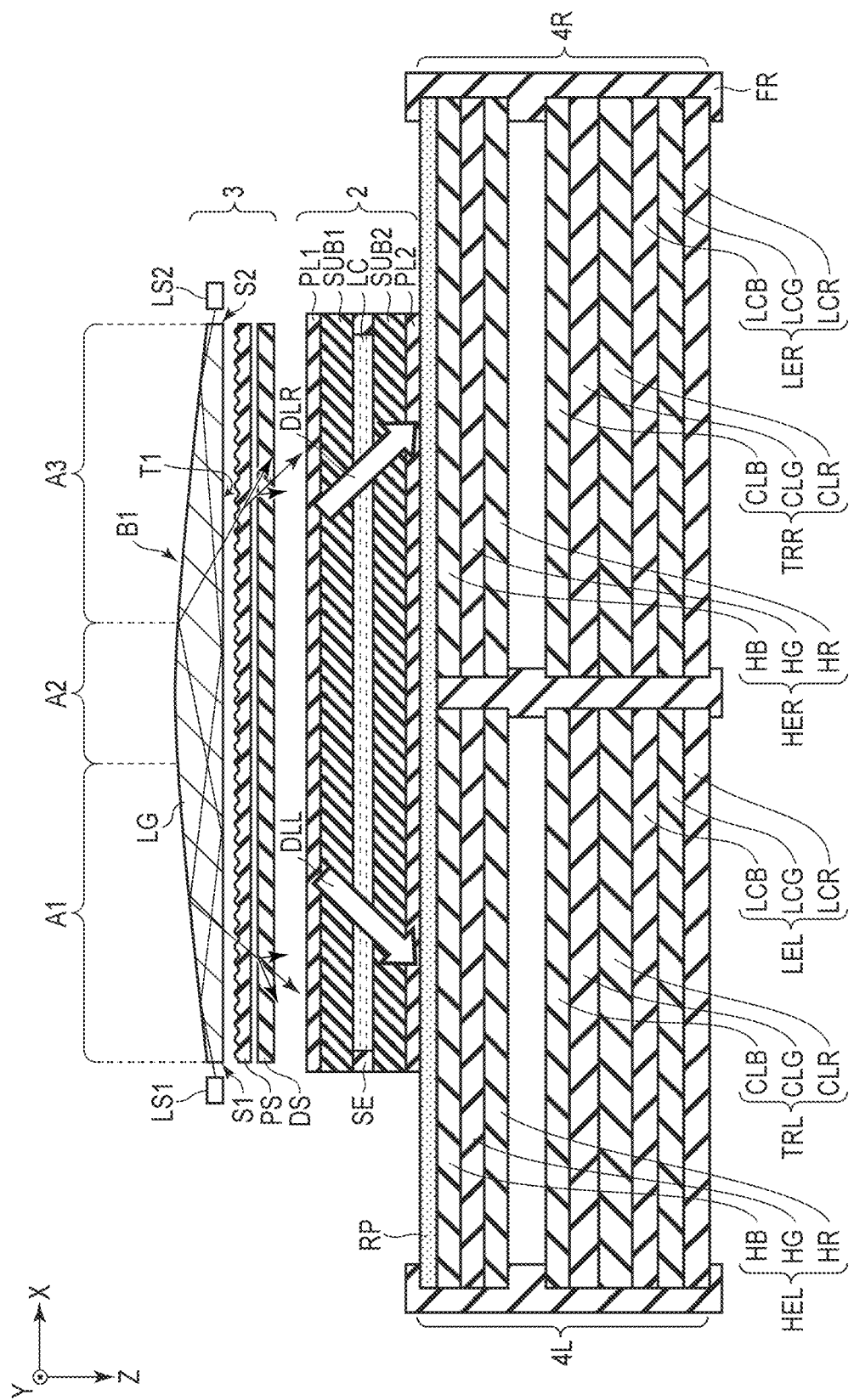
FIG. 11 is a cross-sectional view showing a configuration example of the head-mounted display 1.

FIG. 11 is a cross-sectional view showing a configuration example of the head-mounted display 1.

The head-mounted display 1 comprises the display panel 2, the illumination device 3 shown in FIG. 10, the optical systems 4R and 4L, and a frame FR. The display panel 2 functions as the display panel 2R for the right eye and the display panel 2L for the left eye shown in FIG. 2. The illumination device 3 functions as the illumination device 3R for the right eye and the illumination device 3L for the left eye.

The illumination device 3 comprises the first light source unit LS1, the second light source unit LS2, the light guide LG and optical sheets. As the optical sheets, for example, a prism sheet PS and a diffusion sheet DS are provided. The prism sheet PS is provided between the light guide LG and the diffusion sheet DS in the third direction Z. The diffusion sheet DS is provided between the prism sheet PS and the display panel 2 in the third direction Z.

The first light source unit LS1 mainly emits light which is guided to the optical system 4R while the first light source unit LS1 is located on the left side of the figure. The second light source unit LS2 mainly emits light which is guided to the optical system 4L while the second light source unit LS2 is located on the right side of the figure. As explained with reference to FIG. 10, each of the first light source unit LS1 and the second light source unit LS2 comprises the first light emitting element LDB, the second light emitting element LDG and the third light emitting element LDR.

The display panel 2 comprises a first substrate SUB1, a second substrate SUB2, a liquid crystal layer LC, a first polarizer PL1 and a second polarizer PL2. The liquid crystal layer LC is held between the first substrate SUB1 and the second substrate SUB2, and is sealed by a sealant SE. The first polarizer PL1 is provided between the illumination device 3 and the first substrate SUB1. The second polarizer PL2 is provided between the second substrate SUB2 and the retardation film RP of the optical systems 4R and 4L.

The optical system 4L comprises the retardation film RP, a holographic element HEL, a transflective element TRL and a lens element LEL.

The optical system 4R comprises the retardation film RP, a holographic element HER, a transflective element TRR and a lens element LER. The retardation film RP is provided over the optical systems 4L and 4R. However, the retardation film RP may be individually provided for the optical systems 4L and 4R.

Each of the holographic elements HEL and HER comprises a first hologram HB, a second hologram HG and a third hologram HR. The first hologram HB, the second hologram HG and the third hologram HR are stacked in the third direction Z. It should be noted that the order of stacking the first hologram HB, the second hologram HG and the third hologram HR is not limited to the example shown in the figure. Hereinafter, this specification explains a case where each hologram reflects the first circularly polarized light. However, as described above, the first circularly polarized light CP1 may be replaced by the second circularly polarized light CP2.

The first hologram HB is configured to reflect, of the light having the specific incident angle θ1, the first circularly polarized light having a blue wavelength (first wavelength) λb. The second hologram HG is configured to reflect, of the light having the specific incident angle θ1, the first circularly polarized light having a green wavelength (second wavelength) λg. The third hologram HR is configured to reflect, of the light having the specific incident angle θ1, the first circularly polarized light having a red wavelength (third wavelength) λr.

Each of the transflective elements TRL and TRR comprises a first cholesteric liquid crystal layer CLB, a second cholesteric liquid crystal layer CLG and a third cholesteric liquid crystal layer CLR. The first cholesteric liquid crystal layer CLB, the second cholesteric liquid crystal layer CLG and the third cholesteric liquid crystal layer CLR are stacked in the third direction Z. It should be noted that the order of stacking the first cholesteric liquid crystal layer CLB, the second cholesteric liquid crystal layer CLG and the third cholesteric liquid crystal layer CLR is not limited to the example shown in the figure.

Each of the first cholesteric liquid crystal layer CLB, the second cholesteric liquid crystal layer CLG and the third cholesteric liquid crystal layer CLR is equivalent to the cholesteric liquid crystal layer CL1 explained with reference to FIG. 6 and FIG. 7, and comprises the cholesteric liquid crystals (liquid crystal structures) LMS2 which rotate in the same direction, and is cured in a state where the alignment directions of a plurality of liquid crystal molecules are fixed.

The first cholesteric liquid crystal layer CLB is configured to reflect the first circularly polarized light having a blue wavelength (first wavelength) λb. The second cholesteric liquid crystal layer CLG is configured to reflect the first circularly polarized light having a green wavelength (second wavelength) λg. The third cholesteric liquid crystal layer CLR is configured to reflect the first circularly polarized light having a red wavelength (third wavelength) λr.

Figure 12:
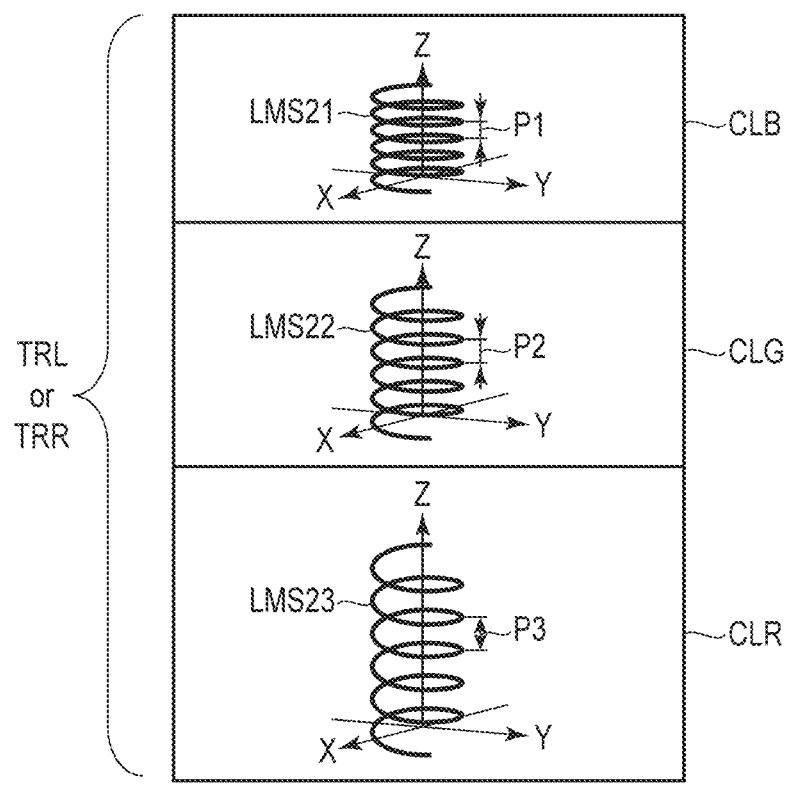
FIG. 12 is a diagram for explaining a first cholesteric liquid crystal layer CLB, a second cholesteric liquid crystal layer CLG and a third cholesteric liquid crystal layer CLR shown in FIG. 11.

FIG. 12 is a schematic enlarged view of the cholesteric liquid crystals contained in each liquid crystal layer. The first helical pitch P1 of the cholesteric liquid crystal LMS21 contained in the first cholesteric liquid crystal layer CLB is optimized so as to correspond to center wavelength λb of the blue laser beam emitted from the first light emitting element LDB.

The second helical pitch P2 of the cholesteric liquid crystal LMS22 contained in the second cholesteric liquid crystal layer CLG is different from the first helical pitch P1. For example, the second helical pitch P2 is optimized so as to correspond to center wavelength λg of the green laser beam emitted from the second light emitting element LDG. Thus, the second helical pitch P2 is greater than the first helical pitch P1.

The third helical pitch P3 of the cholesteric liquid crystal LMS23 contained in the third cholesteric liquid crystal layer CLR is different from the first helical pitch P1 and the second helical pitch P2. For example, the third helical pitch P3 is optimized so as to correspond to center wavelength λr of the red laser beam emitted from the third light emitting element LDR. Thus, the third helical pitch P3 is greater than the second helical pitch P2.

Now, this specification looks at FIG. 11 again.

Each of the lens elements LEL and LER comprises a first liquid crystal layer LCB, a second liquid crystal layer LCG and a third liquid crystal layer LCR. The first liquid crystal layer LCB, the second liquid crystal layer LCG and the third liquid crystal layer LCR are stacked in the third direction Z. It should be noted that the order of stacking the first liquid crystal layer LCB, the second liquid crystal layer LCG and the third liquid crystal layer LCR is not limited to the example shown in the figure.

Each of the first liquid crystal layer LCB, the second liquid crystal layer LCG and the third liquid crystal layer LCR is equivalent to the liquid crystal layer LC1 explained with reference to FIG. 4 and FIG. 5, and is cured in a state where the alignment directions of a plurality of liquid crystal molecules are fixed.

The first liquid crystal layer LCB is configured to condense, of the incident light, the second circularly polarized light having a blue wavelength (first wavelength) λb and impart a half-wave retardation. The second liquid crystal layer LCG is configured to condense, of the incident light, the second circularly polarized light having a green wavelength (second wavelength) λg and impart a half-wave retardation. The third liquid crystal layer LCR is configured to condense, of the incident light, the second circularly polarized light having a red wavelength (third wavelength) λr and impart a half-wave retardation.

Each of the optical systems 4R and 4L comprising the above configuration exerts the optical effect explained with reference to FIG. 8 or FIG. 9.

In the head-mounted display 1 described above, the first light source unit LS1 of the illumination device 3 emits light toward the side surface S1, and the second light source unit LS2 emits light toward the side surface S2. The light which entered the side surface S1 and the light which entered the side surface S2 propagate while repeating reflection between the upper surface T1 and the lower surface B1 of the light guide LG. Of the light which entered the side surface S1, the light which does not satisfy the conditions of total reflection on the upper surface T1 is obliquely emitted so as to proceed toward the optical system 4R and forms illumination light for the right eye. Of the light which entered the side surface S2, the light which does not satisfy the conditions of total reflection on the upper surface T1 is obliquely emitted so as to proceed toward the optical system 4L and forms illumination light for the left eye.

The display panel 2 selectively modulates the illumination light from the illumination device 3. Part of the illumination light for the left eye passes through the second polarizer PL2 and is converted into display light DLL which is linearly polarized light for the left eye. Part of the illumination light for the right eye passes through the second polarizer PL2 and is converted into display light DLR which is linearly polarized light for the right eye.

The display light DLL is condensed to the left eye of the user by the optical effect of the optical system 4L described above. The display light DLR is condensed to the right eye of the user by the optical effect of the optical system 4R described above.

According to the head-mounted display 1 described above, the illumination device 3 comprises the laser light sources which emit light having a narrow spectral width.

Further, the holographic element HE, the transflective element TR and the lens element LE are optimized in accordance with the center wavelength of the light emitted from the laser light sources. By this configuration, the light of each wavelength can be effectively condensed. Further, chromatic aberration can be reduced. Thus, the user can see a vivid image.

FIG. 13 is a plan view showing another configuration example of the illumination device which can be applied to the display device DSP shown in FIG. 3. The illumination device shown in FIG. 13 comprises the illumination device 3L for the left eye and the illumination device 3R for the right eye. FIG. 13 shows only the main portions of the illumination devices 3L and 3R.

The illumination device 3L comprises a first light guide LG1 and the first light source unit LS1. The illumination device 3R comprises a second light guide LG2 and the second light source unit LS2. The first light guide LG1 and the second light guide LG2 are arranged across an intervening space in the first direction X.

The first light guide LG1 comprises a side surface S11 and a side surface S12. The side surface S11 faces the side surface S12 in the first direction X. The side surface S12 is covered with a reflective film RF1.

The first light guide LG1 comprises an area A11 and an area A12. The area A11 and the area A12 are adjacent to each other in the first direction X. The thickness of the area A12 in the third direction Z is substantially constant. The thickness of the area A11 gradually increases from the side surface S11 toward the area A12.

The second light guide LG2 comprises a side surface S21 and a side surface S22. The side surface S21 faces the side surface S22 in the first direction X. The side surface S22 faces the side surface S12 in the first direction X. The side surface S22 is covered with a reflective film RF2.

The second light guide LG2 comprises an area A21 and an area A22. The area A21 and the area A22 are adjacent to each other in the first direction X. The thickness of the area A22 in the third direction Z is substantially constant. The thickness of the area A21 gradually increases from the side surface S21 toward the area A22.

The first light source unit LS1 is provided along the side surface S11. The second light source unit LS2 is provided along the side surface S21. Each of the first light source unit LS1 and the second light source unit LS2 comprises, as the light emitting elements LD, the first light emitting element LDB which emits light having a blue wavelength (first wavelength), the second light emitting element LDG which emits light having a green wavelength (second wavelength) and the third light emitting element LDR which emits light having a red wavelength (third wavelength). The first light emitting element LDB, the second light emitting element LDG and the third light emitting element LDR are arranged at intervals.

Figure 14:
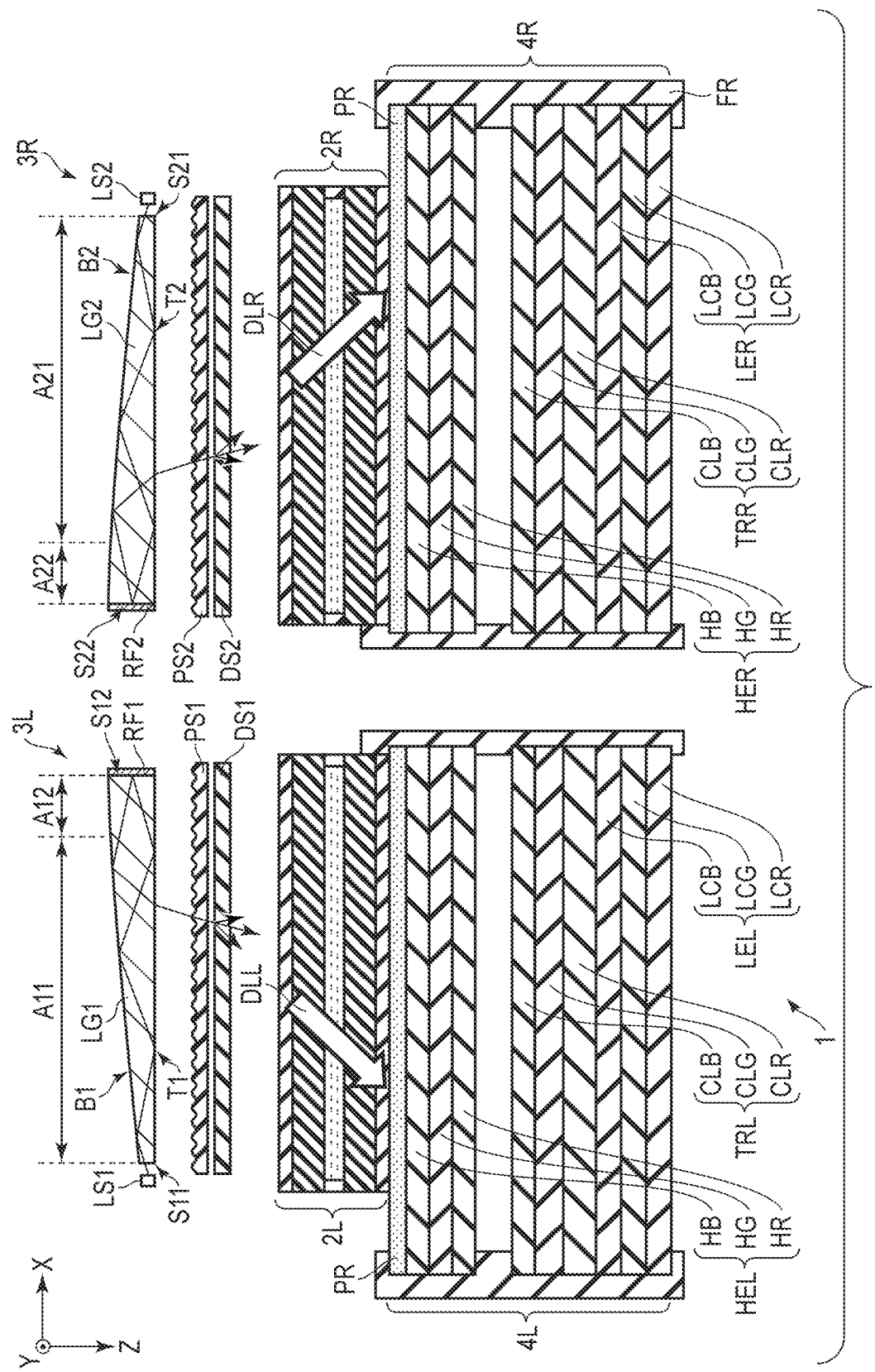
FIG. 14 is a cross-sectional view showing another configuration example of the head-mounted display 1.

FIG. 14 is a cross-sectional view showing another configuration example of the head-mounted display 1.

The head-mounted display 1 comprises the display panels 2L and 2R, the illumination devices 3L and 3R shown in FIG. 13, the optical systems 4L and 4R, and the frame FR.

The configuration of each of the illumination devices 3L and 3R is as explained with reference to FIG. 13. The configuration of each of the display panels 2L and 2R is equivalent to the configuration of the display panel 2 shown in FIG. 11. The configuration of the optical systems 4L and 4R is equivalent to the configuration of the optical systems 4L and 4R shown in FIG. 11. It should be noted that the optical systems 4L and 4R are spaced apart from each other and are supported in the frame FR.

In the head-mounted display 1 described above, the first light source unit LS1 of the illumination device 3L emits light toward the side surface S11. The light which entered the side surface S11 propagates while repeating reflection between the upper surface T1 and the lower surface B1 of the first light guide LG1. Of the light reflected on the reflective film RF1, the light which does not satisfy the conditions of total reflection on the upper surface T1 is obliquely emitted so as to proceed toward the optical system 4L and forms illumination light for the left eye.

The display panel 2L selectively modulates the illumination light from the illumination device 3L. Part of the illumination light passes through the second polarizer PL2 and is converted into display light DLL which is linearly polarized light for the left eye. The display light DLL is condensed to the left eye of the user by the optical effect of the optical system 4L described above.

The second light source unit LS2 of the illumination device 3R emits light toward the side surface S21. The light which entered the side surface S21 propagates while repeating reflection between the upper surface T2 and the lower surface B2 of the second light guide LG2. Of the light reflected on the reflective film RF2, the light which does not satisfy the conditions of total reflection on the upper surface T2 is obliquely emitted so as to proceed toward the optical system 4R and forms illumination light for the right eye.

The display panel 2R selectively modulates the illumination light from the illumination device 3R. Part of the illumination light passes through the second polarizer PL2 and is converted into display light DLR which is linearly polarized light for the right eye. The display light DLR is condensed to the right eye of the user by the optical effect of the optical system 4R described above.

In this head-mounted display 1, effects similar to those of the above example can be obtained.

Second Configuration Example

FIG. 15 is a cross-sectional view showing the second configuration example of the display device DSP.

The display device DSP comprises the display panel 2, the illumination device 3 and the optical system 4. In the figure, the details of the display panel 2 and the illumination device 3 are omitted. The display device DSP explained here can be applied to each of the display devices DSPR and DSPL shown in FIG. 2. The display panel 2 can be applied to each of the display panels 2R and 2L described above. The illumination device 3 can be applied to each of the illumination devices 3R and 3L described above. The optical system 4 can be applied to each of the optical systems 4R and 4L described above.

The second configuration example shown in FIG. 15 is different from the first configuration example shown in FIG. 3 in terms of the configuration of the optical system 4. The configuration of each of the display panel 2 and the illumination device 3 is the same as the first configuration example. Thus, the detailed descriptions thereof are omitted.

The optical system 4 comprises the first structure 4A and the second structure 4B. The first structure 4A is spaced apart from the second structure 4B. In the example shown in FIG. 15, the air layer 4C is provided between the first structure 4A and the second structure 4B. The first structure 4A is provided between the display panel 2 and the second structure 4B (or between the display panel 2 and the air layer 4C).

The first structure 4A comprises a first holographic element HE1.

The second structure 4B comprises a second holographic element HE2, the retardation film RP and the lens element LE. The retardation film RP is configured in the same manner as the retardation film RP of the first configuration example. The lens element LE is configured in the same manner as the lens element LE of the first configuration example.

Each of the first holographic element HE1 and the second holographic element HE2 is configured in the same manner as the holographic element HE of the first configuration example.

The first holographic element HE1 is configured to reflect light having a first specific incident angle and transmit light having an incident angle different from the first specific incident angle. The second holographic element HE2 is configured to reflect light having a second specific incident angle and transmit light having an incident angle different from the second specific incident angle. The second specific incident angle is an angle different from the first specific incident angle. This configuration is described in detail later.

The second holographic element HE2, the retardation film RP and the lens element LE extend over a range which is wider than the display area DA in the X-Y plane. The second holographic element HE2, the retardation film RP and the lens element LE are stacked in this order in the third direction Z. The second holographic element HE2 faces the first holographic element HE1 via the air layer 4C in the third direction Z.

It should be noted that the retardation film RP may be provided between the display panel 2 and the first holographic element HE1.

Figure 16:
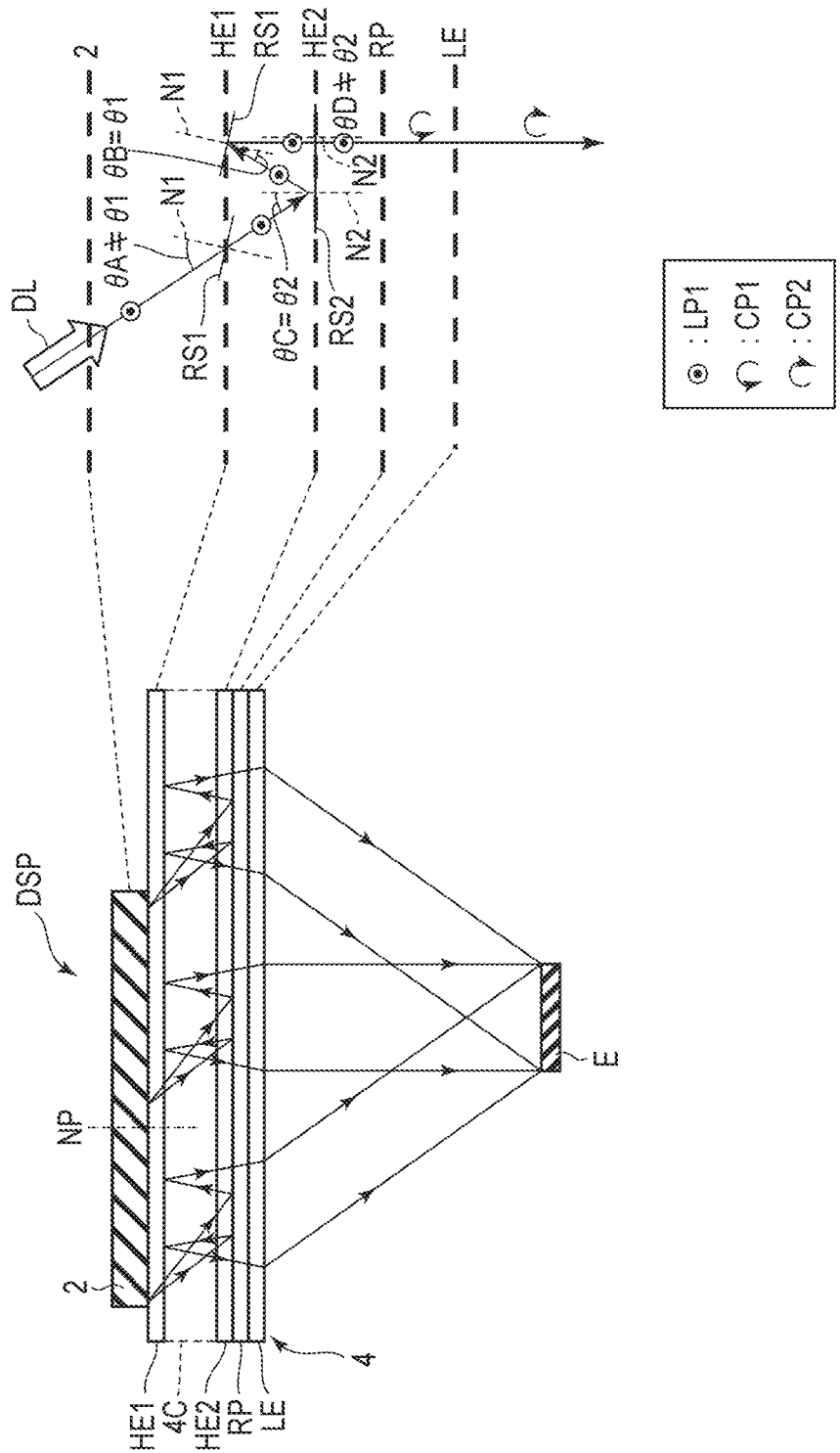
FIG. 16 is a diagram for explaining an example of the optical effect of the display device DSP shown in FIG. 15.

The first holographic element HE1, the second holographic element HE2, the retardation film RP and the lens element LE comprise the first portion P11 extending to the external side relative to the first end portion E1, and the second portion P12 extending to the external side relative to the second end portion E2. In the example shown in FIG. 15, the first portion P11 and the second portion P12 extend in the first direction X. Width W1 of the first portion P11 in the first direction X is greater than width W2 of the second portion P12 in the first direction X (W1>W2). FIG. 16 is a diagram for explaining an example of the optical effect of the display device DSP shown in FIG. 15.

First, the display panel 2 emits display light DL which is first linearly polarized light LP1. The display light DL is emitted in an oblique direction with respect to normal NP of the display panel 2. The display light DL enters the first holographic element HE1. Incident angle θA of the first linearly polarized light LP1 which enters the first holographic element HE1 is different from the first specific incident angle θ1 in the first holographic element HE1. Here, the incident angle is an angle between normal N1 of the virtual reflective surface RS1 and the incident light. The first linearly polarized light LP1 having incident angle θA passes through the first holographic element HE1.

The first linearly polarized light LP1 which passed through the first holographic element HE1 enters the second holographic element HE2. Incident angle ° C. of the first linearly polarized light LP1 which enters the second holographic element HE2 is substantially equal to the second specific incident angle θ2 in the second holographic element HE2. Here, the incident angle is an angle between normal N2 of the virtual reflective surface RS2 and the incident light. The first linearly polarized light LP1 having incident angle ° C. is reflected on the reflective surface RS2 of the second holographic element HE2 toward the first holographic element HE1. When the first linearly polarized light LP1 is reflected on the reflective surface RS2, the polarization state is maintained. In other words, the reflected light on the reflective surface RS2 is the first linearly polarized light LP1.

The first linearly polarized light LP1 reflected on the second holographic element HE2 enters the first holographic element HE1 again. Incident angle $\theta B$ of the first linearly polarized light LP1 which enters the first holographic element HE1 is substantially equal to the first specific incident angle $\theta 1$ in the first holographic element HE1. Thus, the first linearly polarized light LP1 having incident angle $\theta B$ is reflected on the reflective surface RS1 of the first holographic element HE1.

The first linearly polarized light LP1 reflected on the first holographic element HE1 enters the second holographic element HE2 again. Incident angle $\theta D$ of the first linearly polarized light LP1 which enters the second holographic element HE2 is different from the second specific incident angle $\theta 2$ in the second holographic element HE2. Thus, the first linearly polarized light LP1 having incident angle $\theta D$ passes through the second holographic element HE2.

A quarter-wave retardation is imparted to the first linearly polarized light LP1 which passed through the second holographic element HE2 when the first linearly polarized light LP1 passes through the retardation film RP. In this way, the first linearly polarized light LP1 is converted into first circularly polarized light CP1 when passing through the retardation film RP. Here, the first circularly polarized light CP1 is, for example, left-handed circularly polarized light. The first circularly polarized light CP1 which passed through the retardation film RP is converted into second circularly polarized light CP2 in the lens element LE and is condensed to the eyes E of the user by a lens effect.

In the display device DSP having the above configuration, the optical system 4 comprises an optical path which is passed through three times between the first holographic element HE1 and the second holographic element HE2. In this optical path, an oblique optical path from the first holographic element HE1 to the second holographic element HE2 and an oblique optical path from the second holographic element HE2 to the first holographic element HE1 are included. Thus, in the optical system 4, the optical distance between the first holographic element HE1 and the second holographic element HE2 is greater than or equal to three times the actual interval between the first holographic element HE1 and the second holographic element HE2 (or the thickness of the air layer 4C). The display panel 2 is provided on the internal side relative to the focal point of the lens element LE having a lens effect. By this configuration, the user can observe an enlarged virtual image.

In this second configuration example, effects similar to those of the first configuration example can be obtained.

Figure 17:
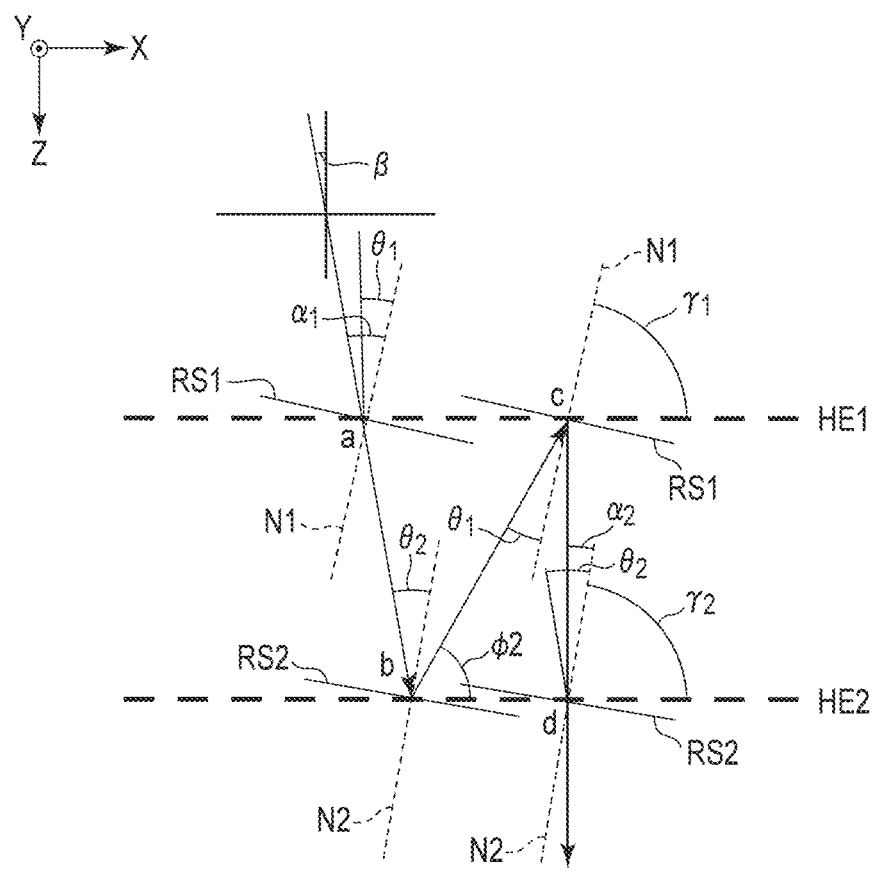
FIG. 17 is a diagram for explaining a first specific incident angle θ1 of a first holographic element HE1 and a second specific incident angle θ2 of a second holographic element HE2 shown in FIG. 16.

FIG. 17 is a diagram for explaining the first specific incident angle $\theta 1$ of the first holographic element HE1 and the second specific incident angle $\theta 2$ of the second holographic element HE2, shown in FIG. 16.

In the first holographic element HE1, the angle between normal N1 of the reflective surface RS1 and the reference surface (X-Y plane) is defined as $\gamma 1$, and the angle between the incident light of incident angle $\beta$ and normal N1 is defined as $\alpha 1$.

In the second holographic element HE2, the angle between normal N2 of the reflective surface RS2 and the reference surface (X-Y plane) is defined as $\gamma 2$, and the angle between the reflected light on the reflective surface RS2 and the reference surface is defined as $\varphi 2$, and the angle between the reflected light on the reflective surface RS1 and normal N2 is defined as $\alpha 2$.

As shown by "c" in the figure, the following equation is derived based on the conditions under which the light having the first specific incident angle $\theta 1$ is reflected on the reflective surface RS1.

$$\gamma 1 = \pi/2 - \theta 1$$

As shown by "b" in the figure, the following equation is derived based on the conditions under which the light having the second specific incident angle $\theta 2$ is reflected on the reflective surface RS2.

$$\gamma 2 = \theta 2 - 2 \cdot \theta 1 + \pi/2$$

As shown by "a" in the figure, the condition under which light passes through the first holographic element HE1 is as follows.

$$\delta 1 = \alpha 1 - \theta 1 \neq 0$$

Here, the following relationships are established.

$$\alpha 1 = 2 \cdot \theta 2 + \varphi 2 - \gamma 1$$

$$\varphi 2 = \pi/2 - 2 \cdot \theta 1$$

Based on these relationships, the following equation is derived regarding $\delta 1$.

$$\delta 1 = 2 \cdot (\theta 1 - \theta 2) \neq 0$$

Thus, $\theta 1 \neq \theta 2$.

As shown by "d" in the figure, the condition under which light passes through the second holographic element HE2 is as follows.

$$\Omega = \alpha 2 - \theta 2 \neq 0$$

Here, the following relationship is established.

$$\alpha 2 = \pi/2 - \gamma 2$$

The following equation is derived regarding $\delta 2$.

$$\Omega = 2 \cdot (\theta 1 - \theta 2) \neq 0$$

Thus, $\theta 1 \neq \theta 2$.

In this way, as the first specific incident angle $\theta 1$ is different from the second specific incident angle $\theta 2$, the optical system 4 of the second configuration example is established. As the difference between the first specific incident angle $\theta 1$ and the second specific incident angle $\theta 2$ is increased, the conditions under which light passes through the first holographic element HE1 and the second holographic element HE2 are further eased. Thus, the difference should be preferably larger.

At this time, incident angle $\beta$ is as follows.

$$\beta = \alpha 1 + \gamma 1 - \pi/2 = 2 \cdot (\theta 2 - \theta 1)$$

Figure 18:
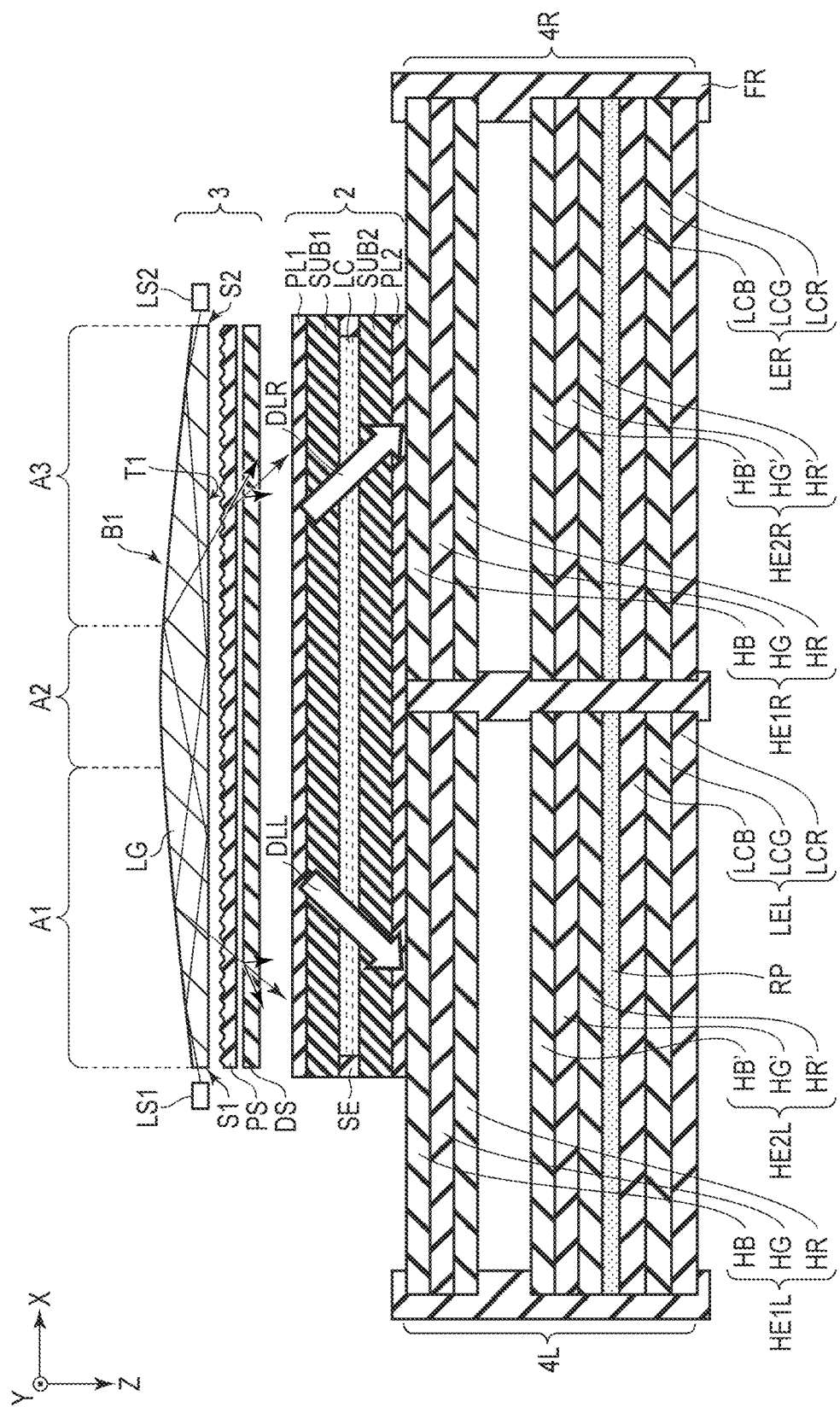
FIG. 18 is a cross-sectional view showing a configuration example of the head-mounted display 1.

FIG. 18 is a cross-sectional view showing a configuration example of the head-mounted display 1.

The head-mounted display 1 comprises the display panel 2, the illumination device 3 shown in FIG. 10, the optical systems 4R and 4L, and the frame FR. The display panel 2 functions as the display panel 2R for the right eye and the display panel 2L for the left eye shown in FIG. 2. The illumination device 3 functions as the illumination device 3R for the right eye and the illumination device 3L for the left eye.

The illumination device 3 comprises the first light source unit LS1, the second light source unit LS2, the light guide LG, the prism sheet PS and the diffusion sheet DS. The prism sheet PS is provided between the light guide LG and the diffusion sheet DS in the third direction Z. The diffusion sheet DS is provided between the prism sheet PS and the display panel 2 in the third direction Z.

The first light source unit LS1 mainly emits light which is guided to the optical system 4R while the first light source unit LS1 is located on the left side of the figure. The second light source unit LS2 mainly emits light which is guided the optical system 4L while the second light source unit LS2 is located on the right side of the figure. As explained with reference to FIG. 10, each of the first light source unit LS1 and the second light source unit LS2 comprises the first light emitting element LDB, the second light emitting element LDG and the third light emitting element LDR.

The display panel 2 comprises the first substrate SUB1, the second substrate SUB2, the liquid crystal layer LC, the first polarizer PL1 and the second polarizer PL2. The liquid crystal layer LC is held between the first substrate SUB1 and the second substrate SUB2, and is sealed by the sealant SE. The first polarizer PL1 is provided between the illumination device 3 and the first substrate SUB1. The second polarizer PL2 is provided between the second substrate SUB2 and the retardation film RP of the optical systems 4R and 4L.

The optical system 4L comprises a first holographic element HE1L, a second holographic element HE2L, the retardation film RP and the lens element LEL.

The optical system 4R comprises a first holographic element HE1R, a second holographic element HE2R, the retardation film RP and the lens element LER. The retardation film RP is provided over the optical systems 4L and 4R. However, the retardation film RP may be individually provided for the optical systems 4L and 4R.

Each of the first holographic elements HE1L and HE1R comprises the first hologram HB, the second hologram HG and the third hologram HR. The first hologram HB, the second hologram HG and the third hologram HR are stacked in the third direction Z. It should be noted that the order of stacking the first hologram HB, the second hologram HG and the third hologram HR is not limited to the example shown in the figure.

The first hologram HB is configured to reflect, of the light having the first specific incident angle $\theta 1$, light having a blue wavelength (first wavelength) $\lambda b$. The second hologram HG is configured to reflect, of the light having the first specific incident angle $\theta 1$, light having a green wavelength (second wavelength) $\lambda g$. The third hologram HR is configured to reflect, of the light having the first specific incident angle $\theta 1$, light having a red wavelength (third wavelength) $\lambda r$.

Each of the second holographic elements HE2L and HE2R comprises a first hologram HB', a second hologram HG' and a third hologram HR'. The first hologram HB', the second hologram HG' and the third hologram HR' are stacked in the third direction Z. It should be noted that the order of stacking the first hologram HB', the second hologram HG' and the third hologram HR' is not limited to the example shown in the figure.

The first hologram HB' is configured to reflect, of the light having the second specific incident angle $\theta 2$, light having a blue wavelength (first wavelength) $\lambda b$. The second hologram HG' is configured to reflect, of the light having the second specific incident angle $\theta 2$, light having a green wavelength (second wavelength) $\lambda g$. The third hologram HR' is configured to reflect, of the light having the second specific incident angle $\theta 2$, light having a red wavelength (third wavelength) $\lambda r$.

Each of the lens elements LEL and LER comprises the first liquid crystal layer LCB, the second liquid crystal layer LCG and the third liquid crystal layer LCR. The first liquid crystal layer LCB, the second liquid crystal layer LCG and the third liquid crystal layer LCR are stacked in the third direction Z. It should be noted that the order of stacking the first liquid crystal layer LCB, the second liquid crystal layer LCG and the third liquid crystal layer LCR is not limited to the example shown in the figure.

Each of the first liquid crystal layer LCB, the second liquid crystal layer LCG and the third liquid crystal layer LCR is equivalent to the liquid crystal layer LC1 explained with reference to FIG. 4 and FIG. 5, and is cured in a state where the alignment directions of a plurality of liquid crystal molecules are fixed.

The first liquid crystal layer LCB is configured to condense, of the incident light, the first circularly polarized light having a blue wavelength (first wavelength) $\lambda b$ and impart a half-wave retardation. The second liquid crystal layer LCG is configured to condense, of the incident light, the first circularly polarized light having a green wavelength (second wavelength) $\lambda g$ and impart a half-wave retardation. The third liquid crystal layer LCR is configured to condense, of the incident light, the first circularly polarized light having a red wavelength (third wavelength) $\lambda r$ and impart a half-wave retardation.

Each of the optical systems 4R and 4L comprising the above configuration exerts the optical effect explained with reference to FIG. 16.

In the head-mounted display 1 described above, the first light source unit LS1 of the illumination device 3 emits light toward the side surface S1, and the second light source unit LS2 emits light toward the side surface S2. The light which entered the side surface S1 and the light which entered the side surface S2 propagate while repeating reflection between the upper surface T1 and the lower surface B1 of the light guide LG. Of the light which entered the side surface S1, the light which does not satisfy the conditions of total reflection on the upper surface T1 is obliquely emitted so as to proceed toward the optical system 4R and forms illumination light for the right eye. Of the light which entered the side surface S2, the light which does not satisfy the conditions of total reflection on the upper surface T1 is obliquely emitted so as to proceed toward the optical system 4L and forms illumination light for the left eye.

The display panel 2 selectively modulates the illumination light from the illumination device 3. Part of the illumination light for the left eye passes through the second polarizer PL2 and is converted into display light DLL which is linearly polarized light for the left eye. Part of the illumination light for the right eye passes through the second polarizer PL2 and is converted into display light DLR which is linearly polarized light for the right eye.

The display light DLL is condensed to the left eye of the user by the optical effect of the optical system 4L described above. The display light DLR is condensed to the right eye of the user by the optical effect of the optical system 4R described above.

According to the head-mounted display 1 described above, the illumination device 3 comprises the laser light sources which emit light having a narrow spectral width. Further, the first holographic element HE1, the second holographic element HE2 and the lens element LE are optimized in accordance with the center wavelength of the light emitted from the laser light sources. By this configuration, the light of each wavelength can be effectively condensed. Further, chromatic aberration can be reduced. Thus, the user can see a vivid image.

Figure 19:
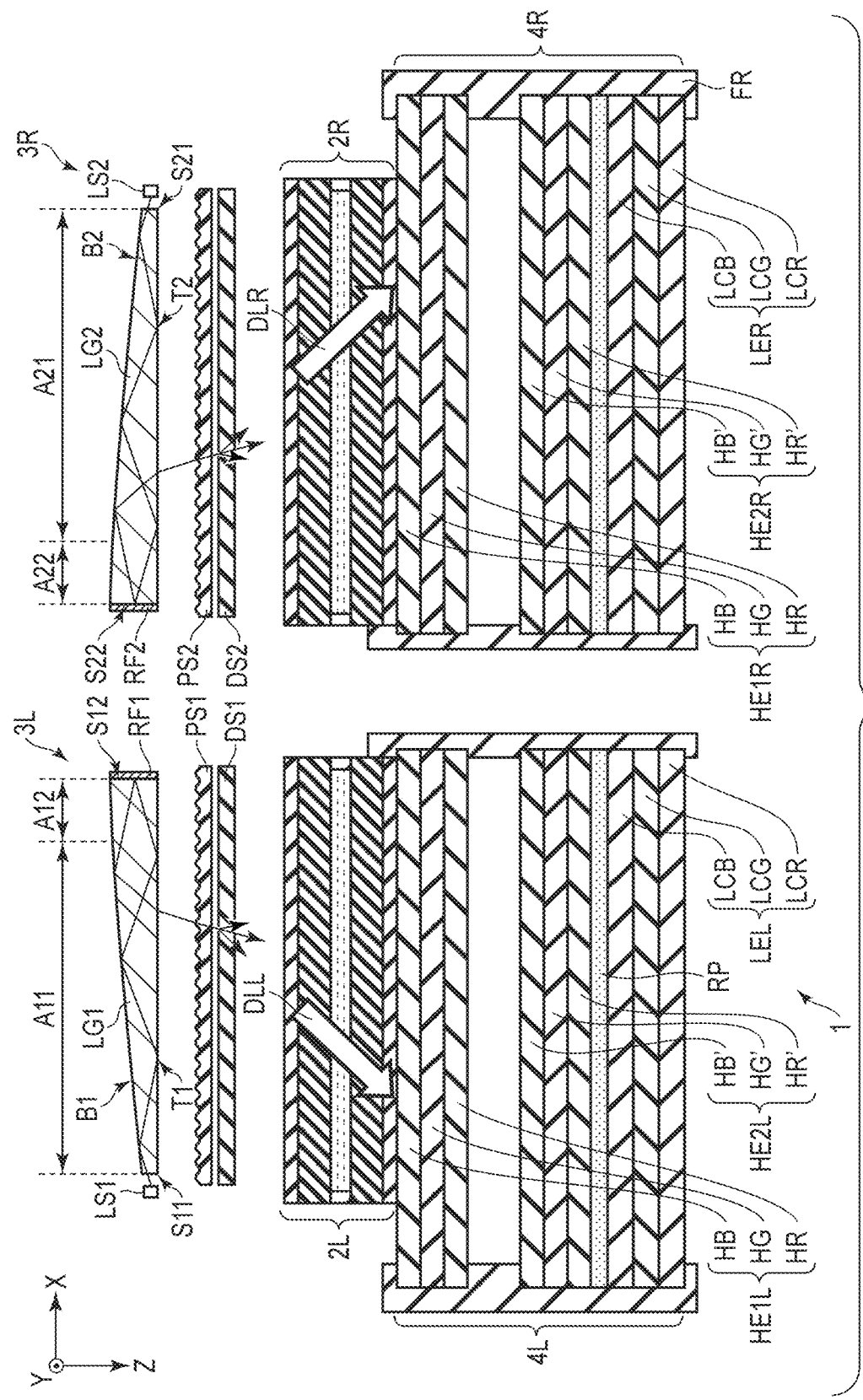
FIG. 19 is a cross-sectional view showing another configuration example of the head mounted-display 1.

FIG. 19 is a cross-sectional view showing another configuration example of the head mounted-display 1.

The head-mounted display 1 comprises the display panels 2L and 2R, the illumination devices 3L and 3R shown in FIG. 13, the optical systems 4L and 4R, and the frame FR.

The configuration of each of the illumination devices 3L and 3R is as explained with reference to FIG. 13. The configuration of each of the display panels 2L and 2R is equivalent to the configuration of the display panel 2 shown in FIG. 18. The configuration of the optical systems 4L and 4R is equivalent to the configuration of the optical systems 4L and 4R shown in FIG. 18.

In the head-mounted display 1 described above, the first light source unit LS1 of the illumination device 3L emits light toward the side surface S11. The light which entered the side surface S11 propagates while repeating reflection between the upper surface T1 and the lower surface B1 of the first light guide LG1. Of the light reflected on the reflective film RF1, the light which does not satisfy the conditions of total reflection on the upper surface T1 is obliquely emitted so as to proceed toward the optical system 4L and forms illumination light for the left eye.

The display panel 2L selectively modulates the illumination light from the illumination device 3L. Part of the illumination light passes through the second polarizer PL2 and is converted into display light DLL which is linearly polarized light for the left eye. The display light DLL is condensed to the left eye of the user by the optical effect of the optical system 4L described above.

The second light source unit LS2 of the illumination device 3R emits light toward the side surface S21. The light which entered the side surface S21 propagates while repeating reflection between the upper surface T2 and the lower surface B2 of the second light guide LG2. Of the light reflected on the reflective film RF2, the light which does not satisfy the conditions of total reflection on the upper surface T2 is obliquely emitted so as to proceed toward the optical system 4R and forms illumination light for the right eye.

The display panel 2R selectively modulates the illumination light from the illumination device 3R. Part of the illumination light passes through the second polarizer PL2 and is converted into display light DLR which is linearly polarized light for the right eye. The display light DLR is condensed to the right eye of the user by the optical effect of the optical system 4R described above.

In this head-mounted display 1, effects similar to those of the above example can be obtained.

As explained above, the present embodiment can provide a display device which can improve the use efficiency of light.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a display panel including a polarizer and comprising a display area configured to emit display light which is linearly polarized light;
    a holographic element configured to reflect light having a specific incident angle and configured to transmit light having an incident angle different from the specific incident angle;
    a retardation film provided between the display panel and the holographic element;
    a transflective element which faces the holographic element across an intervening space, is configured to reflect, of the light which passed through the holographic element, first circularly polarized light, and is configured to transmit second circularly polarized light rotating in an opposite direction of the first circularly polarized light; and
    a lens element which faces the transflective element and has a lens effect of condensing the second circularly polarized light which passed through the transflective element.

2. The display device of claim 1, wherein
    the specific incident angle is 0°.

3. The display device of claim 1, wherein
    the specific incident angle is greater than 0°.

4. The display device of claim 1, further comprising an illumination device provided on a back side of the display panel, wherein
    the illumination device comprises a first light emitting element configured to emit light having a first wavelength, a second light emitting element configured to emit light having a second wavelength different from the first wavelength, and a third light emitting element configured to emit light having a third wavelength different from the first wavelength and the second wavelength.

5. The display device of claim 4, wherein
    each of the first light emitting element, the second light emitting element and the third light emitting element is a laser light source.

6. The display device of claim 4, wherein
    the holographic element comprises a first hologram, a second hologram overlapping the first hologram, and a third hologram overlapping the second hologram,
    the first hologram is configured to reflect, of the light having the specific incident angle, the first circularly polarized light having the first wavelength,
    the second hologram is configured to reflect, of the light having the specific incident angle, the first circularly polarized light having the second wavelength, and
    the third hologram is configured to reflect, of the light having the specific incident angle, the first circularly polarized light having the third wavelength.

7. The display device of claim 4, wherein
    the transflective element comprises a first cholesteric liquid crystal layer, a second cholesteric liquid crystal layer overlapping the first cholesteric liquid crystal layer, and a third cholesteric liquid crystal layer overlapping the second cholesteric liquid crystal layer,
    each of the first cholesteric liquid crystal layer, the second cholesteric liquid crystal layer and the third cholesteric liquid crystal layer comprises cholesteric liquid crystals which rotate in a same direction, and is cured in a state where alignment directions of a plurality of liquid crystal molecules are fixed,
    the first cholesteric liquid crystal layer is configured to reflect the first circularly polarized light having the first wavelength,
    the second cholesteric liquid crystal layer is configured to reflect the first circularly polarized light having the second wavelength, and the third cholesteric liquid crystal layer is configured to reflect the first circularly polarized light having the third wavelength.

8. The display device of claim 7, wherein
the cholesteric liquid crystals of the first cholesteric liquid crystal layer have a first helical pitch,
the cholesteric liquid crystals of the second cholesteric liquid crystal layer have a second helical pitch different from the first helical pitch, and
the cholesteric liquid crystals of the third cholesteric liquid crystal layer have a third helical pitch different from the first helical pitch and the second helical pitch.

9. The display device of claim 4, wherein
the lens element comprises a first liquid crystal layer, a second liquid crystal layer overlapping the first liquid crystal layer, and a third liquid crystal layer overlapping the second liquid crystal layer,
each of the first liquid crystal layer, the second liquid crystal layer and the third liquid crystal layer is cured in a state where alignment directions of a plurality of liquid crystal molecules are fixed,
the first liquid crystal layer is configured to condense the second circularly polarized light having the first wavelength,
the second liquid crystal layer is configured to condense the second circularly polarized light having the second wavelength, and
the third liquid crystal layer is configured to condense the second circularly polarized light having the third wavelength.

10. The display device of claim 9, wherein
each of the first liquid crystal layer, the second liquid crystal layer and the third liquid crystal layer comprises, as seen in plan view, a first annular area in which a plurality of first liquid crystal molecules are aligned in a same direction, and a second annular area in which a plurality of second liquid crystal molecules are aligned in a same direction on an external side of the first annular area, and
an alignment direction of the first liquid crystal molecules are different from an alignment direction of the second liquid crystal molecules.

11. A display device comprising:
a display panel including a polarizer and comprising a display area configured to emit display light which is linearly polarized light;
a first holographic element configured to reflect light having a first specific incident angle and configured to transmit light having an incident angle different from the first specific incident angle;
a second holographic element which faces the first holographic element across an intervening space, is configured to reflect, of the light which passed through the first holographic element, light having a second specific incident angle different from the first specific incident angle, and is configured to transmit light having an incident angle different from the second specific incident angle;
a lens element which faces the second holographic element and has a lens effect of condensing, of the light which passed through the second holographic element, first circularly polarized light; and
a retardation film provided between the display panel and the first holographic element or between the second holographic element and the lens element.

12. The display device of claim 11, wherein
when an incident angle of the display light on the first holographic element is defined as $\beta$, and the first specific incident angle is defined as $\theta 1$, and the second specific incident angle is defined as $\theta 2$, a relationship of $\beta = 2 \cdot (\theta 2 - \theta 1)$ is established.

13. The display device of claim 12, further comprising an illumination device provided on a back side of the display panel, wherein
the illumination device comprises a first light emitting element configured to emit light having a first wavelength, a second light emitting element configured to emit light having a second wavelength different from the first wavelength, and a third light emitting element configured to emit light having a third wavelength different from the first wavelength and the second wavelength, and
the illumination device is configured to form light having the incident angle $\beta$.

14. The display device of claim 13, wherein
each of the first light emitting element, the second light emitting element and the third light emitting element is a laser light source.

15. The display device of claim 13, wherein
each of the first holographic element and the second holographic element comprises a first hologram, a second hologram overlapping the first hologram, and a third hologram overlapping the second hologram,
the first hologram of the first holographic element is configured to reflect, of the light having the first specific incident angle, light having the first wavelength,
the second hologram of the first holographic element is configured to reflect, of the light having the first specific incident angle, light having the second wavelength,
the third hologram of the first holographic element is configured to reflect, of the light having the first specific incident angle, light having the third wavelength,
the first hologram of the second holographic element is configured to reflect, of the light having the second specific incident angle, light having the first wavelength,
the second hologram of the second holographic element is configured to reflect, of the light having the second specific incident angle, light having the second wavelength, and
the third hologram of the second holographic element is configured to reflect, of the light having the second specific incident angle, light having the third wavelength.

16. The display device of claim 13, wherein
the lens element comprises a first liquid crystal layer, a second liquid crystal layer overlapping the first liquid crystal layer, and a third liquid crystal layer overlapping the second liquid crystal layer,
each of the first liquid crystal layer, the second liquid crystal layer and the third liquid crystal layer is cured in a state where alignment directions of a plurality of liquid crystal molecules are fixed,
the first liquid crystal layer is configured to condense the first circularly polarized light having the first wavelength,
the second liquid crystal layer is configured to condense the first circularly polarized light having the second wavelength, and
the third liquid crystal layer is configured to condense the first circularly polarized light having the third wavelength.

17. The display device of claim 16, wherein
each of the first liquid crystal layer, the second liquid crystal layer and the third liquid crystal layer comprises, as seen in plan view, a first annular area in which a plurality of first liquid crystal molecules are aligned in a same direction, and a second annular area in which a plurality of second liquid crystal molecules are aligned in a same direction on an external side of the first annular area, and
an alignment direction of the first liquid crystal molecules are different from an alignment direction of the second liquid crystal molecules.

* * * * *